United States Patent
Gao et al.

(10) Patent No.: US 11,685,289 B2
(45) Date of Patent: Jun. 27, 2023

(54) CHARGING AND DISCHARGING DEVICE, METHODS OF BATTERY CHARGING AND DISCHARGING, AND CHARGING AND DISCHARGING SYSTEM

(71) Applicant: CONTEMPORARY AMPEREX TECHNOLOGY CO., LIMITED, Ningde (CN)

(72) Inventors: Jinfeng Gao, Ningde (CN); Chen Qi, Ningde (CN); Xiyang Zuo, Ningde (CN); Xiaojian Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/562,286

(22) Filed: Dec. 27, 2021

(65) Prior Publication Data
US 2023/0035744 A1    Feb. 2, 2023

Related U.S. Application Data

(63) Continuation of application No. PCT/CN2021/109379, filed on Jul. 29, 2021.

(51) Int. Cl.
*B60L 58/12* (2019.01)
*B60L 50/64* (2019.01)
*H02J 7/00* (2006.01)

(52) U.S. Cl.
CPC .............. *B60L 58/12* (2019.02); *B60L 50/64* (2019.02); *H02J 7/007* (2013.01); *B60L 2210/10* (2013.01); *B60L 2210/30* (2013.01)

(58) Field of Classification Search
None
See application file for complete search history.

(56) References Cited

U.S. PATENT DOCUMENTS

2018/0362016 A1* 12/2018 Atala ................ B60W 20/15
2019/0115175 A1* 4/2019 Saito ................. H02H 1/0007
(Continued)

FOREIGN PATENT DOCUMENTS

CN    103762703 A    4/2014
CN    104283298 A    1/2015
(Continued)

OTHER PUBLICATIONS

International Search Report and Written Opinion dated Apr. 14, 2022 received in International Application No. PCT/CN2021/109379 together with an English language translation.
(Continued)

*Primary Examiner* — Adam D Tissot
*Assistant Examiner* — Garrett F Evans
(74) *Attorney, Agent, or Firm* — Scully, Scott, Murphy & Presser, P.C.

(57) ABSTRACT

Embodiments of the present application provide a charging and discharging device. The charging and discharging device includes an AC/DC converter, a first DC/DC converter, a second DC/DC converter and a control unit. The control unit is used to: receive a first charging request, the first charging request including a first charging voltage and a first charging current; set output power of the first DC/DC converter based on the first charging voltage and the first charging current; turn on the second DC/DC converter if an SOC of the energy storage unit is greater than a first threshold to charge the battery by the energy storage unit; and adjust output power of the second DC/DC converter, so as to enable a voltage difference between a bus voltage and a bus balance voltage of the charging and discharging device to be less than or equal to a preset value.

20 Claims, 13 Drawing Sheets

(56) References Cited

U.S. PATENT DOCUMENTS

| | | | | |
|---|---|---|---|---|
| 2019/0329663 A1* | 10/2019 | Kominami | ............ | H02M 3/01 |
| 2021/0252947 A1* | 8/2021 | She | ............ | H02J 3/32 |
| 2021/0268975 A1* | 9/2021 | Hagi | ............ | H01M 50/249 |
| 2021/0402888 A1* | 12/2021 | Alves | ............ | B60L 50/64 |

FOREIGN PATENT DOCUMENTS

| | | | |
|---|---|---|---|
| CN | 208272645 | U | 12/2018 |
| KR | 20080109053 | A | 12/2008 |
| KR | 20100133993 | A | 12/2010 |
| KR | 20130063816 | A | 6/2013 |
| KR | 20190040634 | A | 4/2019 |
| KR | 20210037105 | A | 4/2021 |
| WO | 2017148407 | A1 | 9/2017 |

OTHER PUBLICATIONS

Notice of Allowance dated May 3, 2023 received on Korean Patent Application No. KR 10-2021-7040289.

* cited by examiner

1200

```
┌─────────────────────────────────────────────────┐
│ Receiving a first charging request transmitted  │
│ by a BMS of the battery, the first charging     │──── 1210
│ request including a first charging voltage and  │
│ a first charging current                        │
└─────────────────────────────────────────────────┘
                        │
┌─────────────────────────────────────────────────┐
│ Setting output power of the first DC/DC         │
│ converter as first output power of the first    │──── 1220
│ DC/DC converter based on the first charging     │
│ voltage and the first charging current          │
└─────────────────────────────────────────────────┘
                        │
┌─────────────────────────────────────────────────┐
│   Acquiring the SOC of the energy storage unit  │──── 1230
└─────────────────────────────────────────────────┘
                        │
┌─────────────────────────────────────────────────┐
│ Turning on the second DC/DC converter if the    │
│ SOC of the energy storage unit is greater than  │
│ a first threshold, to charging the battery by   │──── 1240
│ the energy storage unit through the first       │
│ DC/DC converter and the second DC/DC converter  │
└─────────────────────────────────────────────────┘
                        │
┌─────────────────────────────────────────────────┐
│ Acquiring the bus voltage of the charging and   │──── 1250
│ discharging device in real time                 │
└─────────────────────────────────────────────────┘
                        │
┌─────────────────────────────────────────────────┐
│ in the process of charging the battery by the   │
│ energy storage unit, if the bus voltage is less │
│ than the bus balance voltage and the difference │
│ between the bus voltage and the bus balance     │
│ voltage exceeds a preset value, adjusting the   │──── 1260
│ output power of the second DC/DC converter to   │
│ the first output power of the second DC/DC      │
│ converter, where the first output power of the  │
│ second DC/DC converter is less than or equal to │
│ the maximum output power of the second DC/DC    │
│ converter                                       │
└─────────────────────────────────────────────────┘
```

Receiving a first discharging request transmitted by a BMS of the battery, the first discharging request including a first discharging voltage and a first discharging current — 1310

Setting the input power of the first DC/DC converter as first input power of the first DC/DC converter based on the first discharging voltage and the first discharging current — 1320

Acquiring the SOC of the energy storage unit — 1330

Turning on the second DC/DC converter if the SOC of the energy storage unit is less than the third so as to release the power of the battery to the energy storage unit through the first DC/DC converter and the second DC/DC converter — 1340

Acquiring the bus voltage of the charging and discharging device in real time — 1350 in the process of releasing the power of the battery to the energy storage unit, if the bus voltage is greater than the bus balance voltage and the difference between the bus voltage and the bus balance voltage exceeds a preset value, adjusting the input power of the second DC/DC converter to the first input power of the second DC/DC converter, where the first input power of the second DC/DC converter is less than or equal to the maximum input power of the second DC/DC converter — 1360

Fig. 13

CHARGING AND DISCHARGING DEVICE, METHODS OF BATTERY CHARGING AND DISCHARGING, AND CHARGING AND DISCHARGING SYSTEM

CROSS-REFERENCE TO RELATED APPLICATIONS

This application is a continuation of International Application No. PCT/CN2021/109379, filed on Jul. 29, 2021, the disclosure of which is hereby incorporated by reference in its entirety.

TECHNICAL FIELD

The present application relates to the field of batteries, and in particular to a charging and discharging device, methods of battery charging and discharging, and a charging and discharging system.

BACKGROUND

With the development of the times, electric vehicles have a great market prospect due to their advantages of high environmental friendliness, low noise and low use cost, which can effectively promote energy conservation and emission reduction, and is beneficial to development and progress of society.

For electrical vehicles, the battery technology is an important factor related to their development, especially the charging time of the battery, which will affect the acceptance of the public on the electrical vehicles. Therefore, how to improve the charging efficiency and/or the discharging efficiency of the battery has become a problem to be solved.

SUMMARY

An embodiment of the present application provides a charging and discharging device, methods of battery charging and discharging, and a charging and discharging system, which can improve the charging efficiency and/or the discharging efficiency of the battery.

In a first aspect, a charging and discharging device is provided. The charging and discharging device includes an AC/DC converter, a first DC/DC converter, a second DC/DC converter and a control unit. One end of the second DC/DC converter is connected between the first DC/DC converter and the AC/DC converter, and the other end is connected to an energy storage unit. The control unit is configured to: receive a first charging request transmitted by a battery management system (BMS) of the battery, the first charging request including a first charging voltage and a first charging current; set the output power of the first DC/DC converter as first output power of the first DC/DC converter based on the first charging voltage and the first charging current; acquire a SOC of the energy storage unit; turn on the second DC/DC converter if the SOC of the energy storage unit is greater than a first threshold so as to charge the battery by the energy storage unit through the first DC/DC converter and the second DC/DC converter; acquire the bus voltage of the charging and discharging device in real time; and adjust the output power of the second DC/DC converter to first output power of the second DC/DC converter if the bus voltage is less than the bus balance voltage and a difference between the bus voltage and the bus balance voltage exceeds a preset value in the process of charging the battery by the energy storage unit, where the first output power of the second DC/DC converter is less than or equal to the maximum output power of the second DC/DC converter, and the difference between the bus voltage and the bus balance voltage is less than or equal to the preset value when the second DC/DC converter works on the basis of the first output power of the second DC/DC converter.

In the embodiment of the present application, besides the AC/DC converter and the first DC/DC converter, the charging and discharging device is additionally provided with the second DC/DC converter which is connected between the first DC/DC converter and the AC/DC converter, therefore, the battery may be charged by the energy storage unit connected to the second DC/DC converter in addition to the alternating current power supply, thereby improving the charging efficiency of the charging and discharging device. The charging and discharging device may determine to adopt one or two of the energy storage unit and the alternating current power supply in real time to charge the battery according to the SOC of the energy storage unit and the bus voltage in the charging process, thereby ensuring the stability and balance in the charging process.

In a possible implementation, the control unit is further configured to: adjust the output power of the second DC/DC converter to the maximum output power of the second DC/DC converter, turn on the AC/DC converter, and adjust the output power of the AC/DC converter to first output power of the AC/DC converter if the bus voltage is less than the bus balance voltage and the difference between the bus voltage and the bus balance voltage exceeds the preset value in the process of charging the battery by the energy storage unit, to charge the battery by the alternating current power supply through the AC/DC converter and the first DC/DC converter simultaneously, where the difference between the bus voltage and the bus balance voltage is less than or equal to the preset value when the second DC/DC converter works on the basis of the maximum output power of the second DC/DC converter and the AC/DC converter works under the first output power of the AC/DC converter.

In this embodiment, when the SOC of the energy storage unit is larger, the energy storage unit is preferentially used to charge the battery so as to release power stored in the energy storage unit and prepare for receiving the power released by the battery later; moreover, when the difference between the bus voltage and the bus balance voltage is larger, the alternating current power supply is turned on, and the battery is charged by the alternating current power supply and the energy storage unit jointly, so that balance between the bus voltage and the bus balance voltage is maintained, and the charging and discharging device can charge the battery in a stable state.

In a second aspect, a charging and discharging device is provided. The charging and discharging device includes an AC/DC converter, a first DC/DC converter, a second DC/DC converter and a control unit. One end of the second DC/DC converter is connected between the first DC/DC converter and the AC/DC converter, and the other end is configured to be connected to an energy storage unit. The control unit is configured to: receive a first discharging request transmitted by a BMS of the battery the first discharging request including a first discharging voltage and a first discharging current; set input power of the first DC/DC converter as first input power of the first DC/DC converter based on the first discharging voltage and the first discharging current; acquire a SOC of the energy storage unit; turn on the second DC/DC converter if the SOC of the energy storage unit is less than a third threshold so as to release the power of the battery to the energy storage unit through the first DC/DC converter and the second DC/DC converter; acquire the bus voltage of the charging and discharging device in real time; and adjust input power of the second DC/DC converter to first input power of the second DC/DC converter if the bus voltage is greater than the bus balance voltage and a difference between the bus voltage and the bus balance voltage exceeds a preset value in the process of releasing the power of the battery to the energy storage unit, where the first input power of the second DC/DC converter is less than or equal to the maximum input power of the second DC/DC converter, and the difference between the bus voltage and the bus balance voltage is less than or equal to the preset value when the second DC/DC converter works on the basis of the first input power of the second DC/DC converter.

In the embodiment of present application, besides the AC/DC converter and the first DC/DC converter, the charging and discharging device is additionally provided with the second DC/DC converter which is connected between the first DC/DC converter and the AC/DC converter, therefore, the battery may release the power to the energy storage unit connected to the second DC/DC converter, thereby improving the output capability of the charging and discharging device. The charging and discharging device may determine to release the power of the battery to one or two of the energy storage unit and the alternating current power supply according to the SOC of the energy storage unit and the bus voltage in the discharging process, thereby ensuring the stability and balance in the discharging process.

In a possible implementation, the control unit is further configured to: adjust the input power of the second DC/DC converter to the maximum input power of the second DC/DC converter, turn on the AC/DC converter, and adjust the input power of the AC/DC converter to first input power of the AC/DC converter if the bus voltage is less than the bus balance voltage and the difference between the bus voltage and the bus balance voltage exceeds the preset value in the process of releasing the power of the battery to the energy storage unit, to release the power of the battery to the alternating current power supply through the AC/DC converter and the first DC/DC converter simultaneously, where the difference between the bus voltage and the bus balance voltage is less than or equal to the preset value when the second DC/DC converter works on the basis of the maximum input power of the second DC/DC converter, and the AC/DC converter works under the first input power of the AC/DC converter.

In this way, when the SOC of the energy storage unit is smaller, the power of the battery is preferentially released to the energy storage unit so as to supplement the power stored in the energy storage unit; and when the difference between the bus voltage and the bus balance voltage is larger, the power of the battery is released to the alternating current power supply at the same time, and the power released by the battery is received by the alternating current power supply and the energy storage unit, so that balance between the bus voltage and the bus balance voltage is maintained, and the charging and discharging device enables the battery to release the power in a stable state.

In a third aspect, a method of battery charging is provided and is applied to the charging and discharging device in the first aspect or in any possible implementation of the first aspect. The charging and discharging device includes an AC/DC converter, a DC/DC converter, a second DC/DC converter and a control unit, where one end of the second DC/DC converter is connected between the first DC/DC converter and the AC/DC converter, and the other end is connected to an energy storage unit. The method includes: receiving a first charging request transmitted by a battery management system (BMS) of the battery, the first charging request including a first charging voltage and a first charging current; setting output power of the first DC/DC converter as first output power of the first DC/DC converter based on the first charging voltage and the first charging current; acquiring a SOC of the energy storage unit; turning on the second DC/DC converter if the SOC of the energy storage unit is greater than a first threshold so as to charge the battery by the energy storage unit through the first DC/DC converter and the second DC/DC converter; acquiring the bus voltage of the charging and discharging device in real time; and adjusting output power of the second DC/DC converter to first output power of the second DC/DC converter if the bus voltage is less than a bus balance voltage and a difference between the bus voltage and the bus balance voltage exceeds the preset value in the process of charging the battery by the energy storage unit, where the first output power of the second DC/DC converter is less than or equal to the maximum output power of the second DC/DC converter, and the difference between the bus voltage and the bus balance voltage is less than or equal to the preset value when the second DC/DC converter works on the basis of the first output power of the second DC/DC converter.

In a fourth aspect, a method of battery discharging is provided and is applied to the charging and discharging device in the second aspect or in any possible implementation of the second aspect. The charging and discharging device includes an AC/DC converter, a first DC/DC converter, a second DC/DC converter and a control unit, where one end of the second DC/DC converter is connected between the first DC/DC converter and the AC/DC converter, and the other end is connected to an energy storage unit. The method includes: receiving a first discharging request transmitted by a BMS of the battery, the first discharging request including a first discharging voltage and a first discharging current; setting input power of the first DC/DC converter as first input power of the first DC/DC converter based on the first discharging voltage and the first discharging current; acquiring a SOC of the energy storage unit; turning on the second DC/DC converter if the SOC of the energy storage unit is less than a third threshold so as to release the power of the battery to the energy storage unit through the first DC/DC converter and the second DC/DC converter; and adjusting input power of the second DC/DC converter to first input power of the second DC/DC converter if the bus voltage is greater than the bus balance voltage and a difference between the bus voltage and the bus balance voltage exceeds a preset value in the process of releasing the power of the battery to the energy storage unit, where the first input power of the second DC/DC converter is less than or equal to the maximum input power of the second DC/DC converter, and the difference between the bus voltage and the bus balance voltage is less than or equal to the preset value when the second DC/DC converter works on the basis of the first input power of the second DC/DC converter.

In a fifth aspect, a charging and discharging device is provided. The charging and discharging device includes a processor and a memory, where the memory is configured to store a computer program; and the processor is configured to call the computer program to execute the method of battery charging according to the third aspect or in any possible implementation of the third aspect.

In a sixth aspect, a charging and discharging device is provided. The charging and discharging device includes a processor and a memory, where the memory is configured to store a computer program; and the processor is configured to call the computer program to execute the method of battery discharging according to the fourth aspect or any possible implementation of the fourth aspect.

In a seventh aspect, a charging and discharging system is provided. The charging and discharging system includes: a BMS of a battery, the charging and discharging device in the first aspect or in any possible implementation of the first aspect, and/or the charging and discharging device in the second aspect or in any possible implementation of the second aspect.

BRIEF DESCRIPTION OF THE DRAWINGS

In order to describe the technical solutions in the embodiments of the present application more clearly, the following briefly introduces the accompanying drawings required for describing the embodiments of the present application. Apparently, the accompanying drawings in the following description show merely some embodiments of the present application, and a person of ordinary skill in the art may also derive other drawings from these accompanying drawings without creative efforts.

FIG. 12 is a schematic flow block diagram of a method of battery charging according to an embodiment of the present application;

FIG. 13 is a schematic flow block diagram of a method of battery discharging according to an embodiment of the present application.

DESCRIPTION OF EMBODIMENTS

The implementations of the present application are described in more detail below with reference to the accompanying drawings and embodiments. The following detailed description of the embodiments and the accompanying drawings are used to exemplarily describe the principle of the present application, but cannot be used to limit the scope of the present application, that is, the present application is not limited to the described embodiments.

In the description of the present application, it should be noted that "a plurality" means more than two; orientations or position relationships indicated by terms "upper", "lower", "left", "right", "inner", "outer", etc. are only used to facilitate description of the present application and simplify the description, but not to indicate or imply that the mentioned device or elements must have a specific orientation and must be constructed and operated in a specific orientation, and thus, these terms cannot be understood as a limitation to the present application. Moreover, terms like "first", "second", "third" and the like are only used for description, and cannot be understood as indicating or implying relative importance.

In the field of new energy, a traction battery may serve as a main power source of power consumption device (such as vehicles, ships or aircrafts), and an energy storage battery may serve as a charging source of power consumption device. The importance of both the traction battery and the energy storage battery is self-evident. As an example but not a limitation, in some application scenarios, the traction battery may be a battery in a power consumption device, and the energy storage battery may be a battery in a charging apparatus. For convenience of description, both the traction battery and the energy storage battery may be collectively referred to as batteries.

Figure 1:
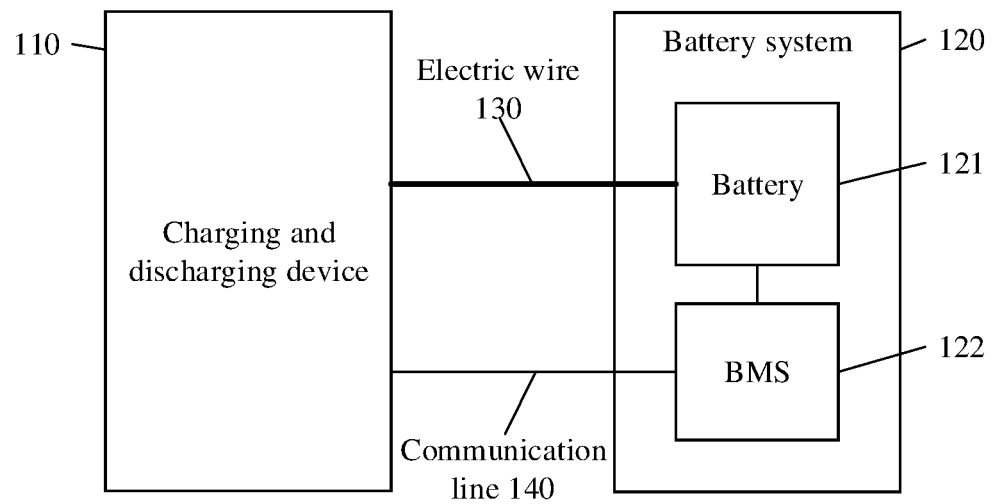
FIG. 1 is an architecture diagram of a charging system suitable for an embodiment of the present application.

FIG. 1 is an architecture diagram of a charging system suitable for an embodiment of the present application.

As shown in FIG. 1, the charging system 100 may include: a charging and discharging device 110 and a battery system 120. Optionally, the battery system 120 may be a battery system in an electric vehicle (including a pure electric vehicle and a plug-in hybrid electric vehicle) or a battery system in other application scenarios.

Optionally, the battery system 120 may be provided with at least one battery pack, and the at least one battery pack may be collectively referred to as a battery 121 as a whole. In terms of battery types, the battery 121 may be any type of battery, including but not limited to: a lithium ion battery, a lithium metal battery, a lithium sulfur battery, a plumbic acid battery, a nickel cadmium battery, a nickel-metal hydride battery, or a lithium air battery, etc. In terms of battery scale, the battery 121 in the embodiment of the present application may be a battery cell, or may also be a battery module or a battery pack, where the battery module or the battery pack are both formed by connecting a plurality of batteries in series or in parallel. In the embodiment of the present application, the specific type and scale of the battery 121 are not specifically limited.

In addition, in order to intelligently manage and maintain the battery 121, prevent overcharging and overdischarging of the battery 121 and prolong the service life of the battery 121, the battery system 120 is generally provided with a battery management system (BMS) 122 for monitoring the state of the battery 121. Optionally, the BMS 122 and the battery 121 may be integrally arranged in the same device/apparatus, or the BMS 122 may serve as an independent device/apparatus arranged outside the battery 121.

Specifically, the charging and discharging device 110 is an apparatus for supplementing power for the battery 121 in the battery system 120 and/or controlling discharging of the battery 121.

Optionally, the charging and discharging device 110 in the embodiment of the present application may be an ordinary charging pile, a supercharging pile and a charging pile which supports vehicle to grid (V2G), or may be a charging and discharging device/device for charging and/or discharging the battery. The embodiment of the present application does not limit the specific type and the specific application scenario of the charging and discharging device 110.

Optionally, as shown in FIG. 1, the charging and discharging device 110 may be connected to the battery 121 through an electric wire 130 and connected to the BMS 122 through a communication line 140, where the communication line 140 is used to realize information interaction between the charging and discharging device 110 and the BMS.

As an example, the communication line 140 includes, but is not limited to a communication bus of a control area network (CAN) or a communication bus of a daisy chain.

Optionally, in addition to communicating with the BMS 122 through the communication line 140, the charging and discharging device 110 may also communicate with the BMS 122 through a wireless network. The embodiment of the present application does not specifically limit the wired communication type or the wireless communication type of the charging and discharging device and the BMS 122.

As for the charging and discharging device 110, it may charge the battery and control the discharging of the battery through different hardware architectures.

Figure 2:
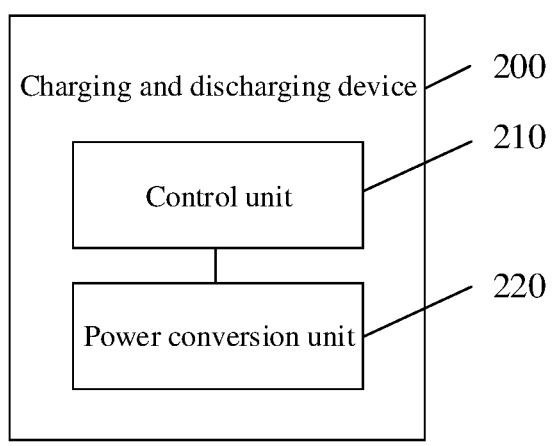
FIG. 2 is a schematic structural block diagram of another charging and discharging device according to an embodiment of the present application.

FIG. 2 is a schematic structural block diagram of another charging and discharging device according to an embodiment of the present application.

As shown in FIG. 2, the charging and discharging device 200 may include: a control unit 210 and a power conversion unit 220.

Where the power conversion unit 220, for example, may include a high-voltage device for realize high-power electric energy conversion; and the control unit 210 may include a low-voltage circuit for realize the control function of the high-voltage device in the power conversion unit 220. In addition, the control unit 210 may also establish communication connection with the BMS. For example, as an example but not a limitation, the control unit 210 may establish communication connection with the BMS through a communication bus, or the control unit 210 may establish communication connection with the BMS through a wireless network.

Figure 3:
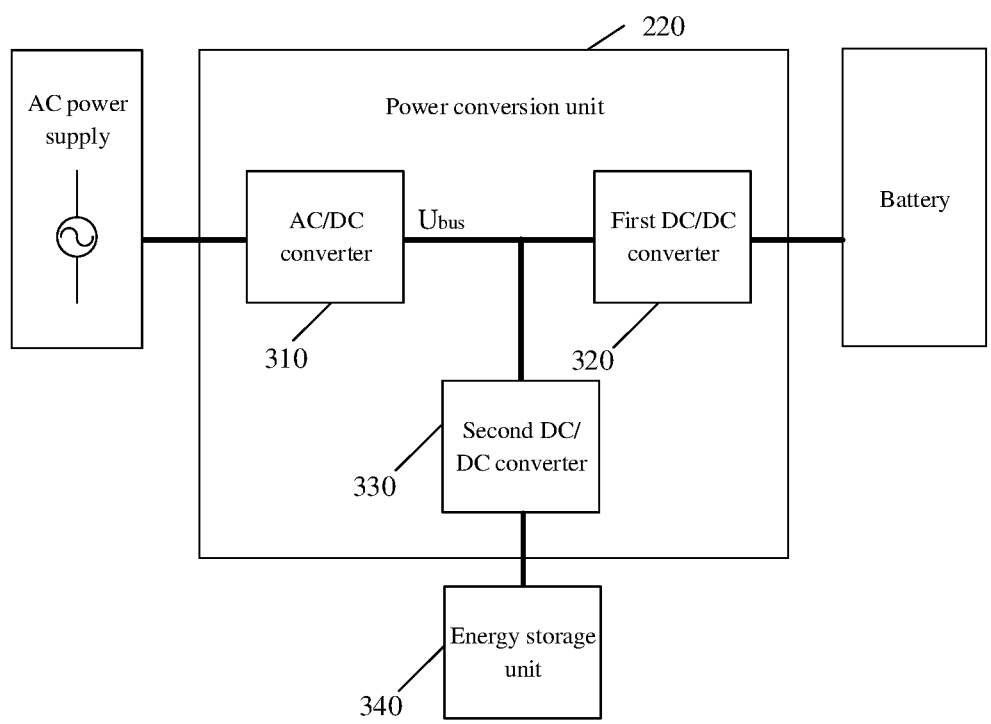
FIG. 3 is a schematic structural block diagram of a power conversion unit in a charging and discharging device according to an embodiment of the present application.

Optionally, as an example, FIG. 3 is a schematic structural block diagram of a power conversion unit 220 according to an embodiment of the present application. The power conversion unit 220 shown in FIG. 3 may be applied to the charging and discharging device in any embodiment of the present application.

As shown in FIG. 3, the power conversion unit 220 may be connected to an alternating current (AC) power supply and a battery. The power conversion unit 220 includes an alternating current/direct current (AC/DC) converter 310, a first direct current/direct current (DC/DC) converter 320 and a second DC/DC converter 330. One end of the second DC/DC converter 330 is connected between the first DC/DC converter 320 and the AC/DC converter 310, and the other end of the second DC/DC converter 330 is connected to an energy storage unit 340.

The energy storage unit 340 may serve as a part of the power conversion unit 220, and may also serve as a unit independent from the power conversion unit 220 and be connected to the power conversion unit 220 through an electric wire. The energy storage unit 340, for example, may be an energy storage battery.

In an implementation, the control unit 210 may control the power conversion unit 130 according to the SOC of the energy storage unit so as to release the power of the battery to the alternating current power supply and/or the energy storage unit 340.

For example, the control unit 210 may determine to preferentially release the power of the battery to one of the alternating current power supply and the energy storage unit 340 according to the SOC of the energy storage unit, and determine whether to turn on the other one of the alternating current power supply and the energy storage unit 340 to release the power of the battery thereto at the same time according to the bus voltage during battery discharging.

In another implementation, the control unit 210 further may control the power conversion unit 130 according to the SOC of the energy storage unit so as to charge the battery through the alternating current power supply and/or the energy storage unit 340.

For example, the control unit 210 may determine to preferentially charge the battery by one of the alternating current power supply and the energy storage unit 340 according to the SOC of the energy storage unit, and determine whether to turn on the other one of the alternating current power supply and the energy storage unit 340 to charge the battery at the same time according to a relation between the bus voltage Ubus and the bus balance voltage Ubalance during charging.

As shown in FIG. 3, the bus voltage Ubus is a voltage between a positive electrode and a negative electrode of a first end of the first DC/DC converter 320, where the first end of the first DC/DC converter 320 is used to be connected to the AC/DC converter 310 and one end of the second DC/DC converter 330.

The bus balance voltage Ubalance is a voltage designed for the charging system, and may be generally equal to a rated bus voltage of the charging system. For a three-phase alternating current power supply, the bus balance voltage Ubalance, for example, may be set as 650V to 850V.

In the embodiment of present application, besides the AC/DC converter and the first DC/DC converter, the charging and discharging device is additionally provided with the second DC/DC converter which is connected between the first DC/DC converter and the AC/DC converter, therefore, the battery may release the power to the energy storage unit connected to the second DC/DC converter, thereby improving the output capability of the charging and discharging device. The charging and discharging device may determine to release the power of the battery to one or two of the energy storage unit and the alternating current power supply according to the SOC of the energy storage unit and the bus voltage in the discharging process, thereby ensuring the stability and balance in the discharging process.

Figure 4:
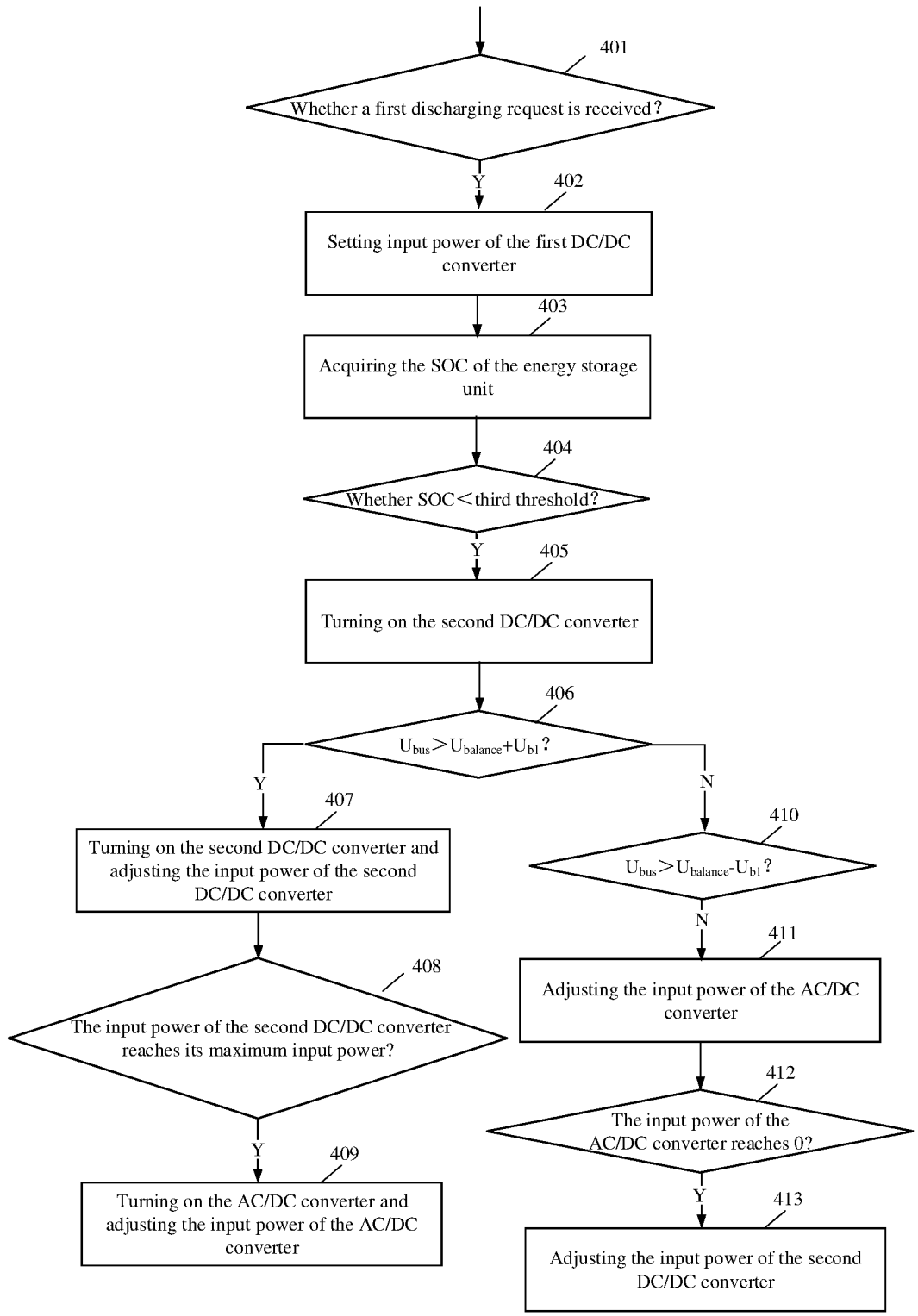
FIG. 4 is a schematic flowchart of battery discharging according to an embodiment of the present application.
Figure 5:
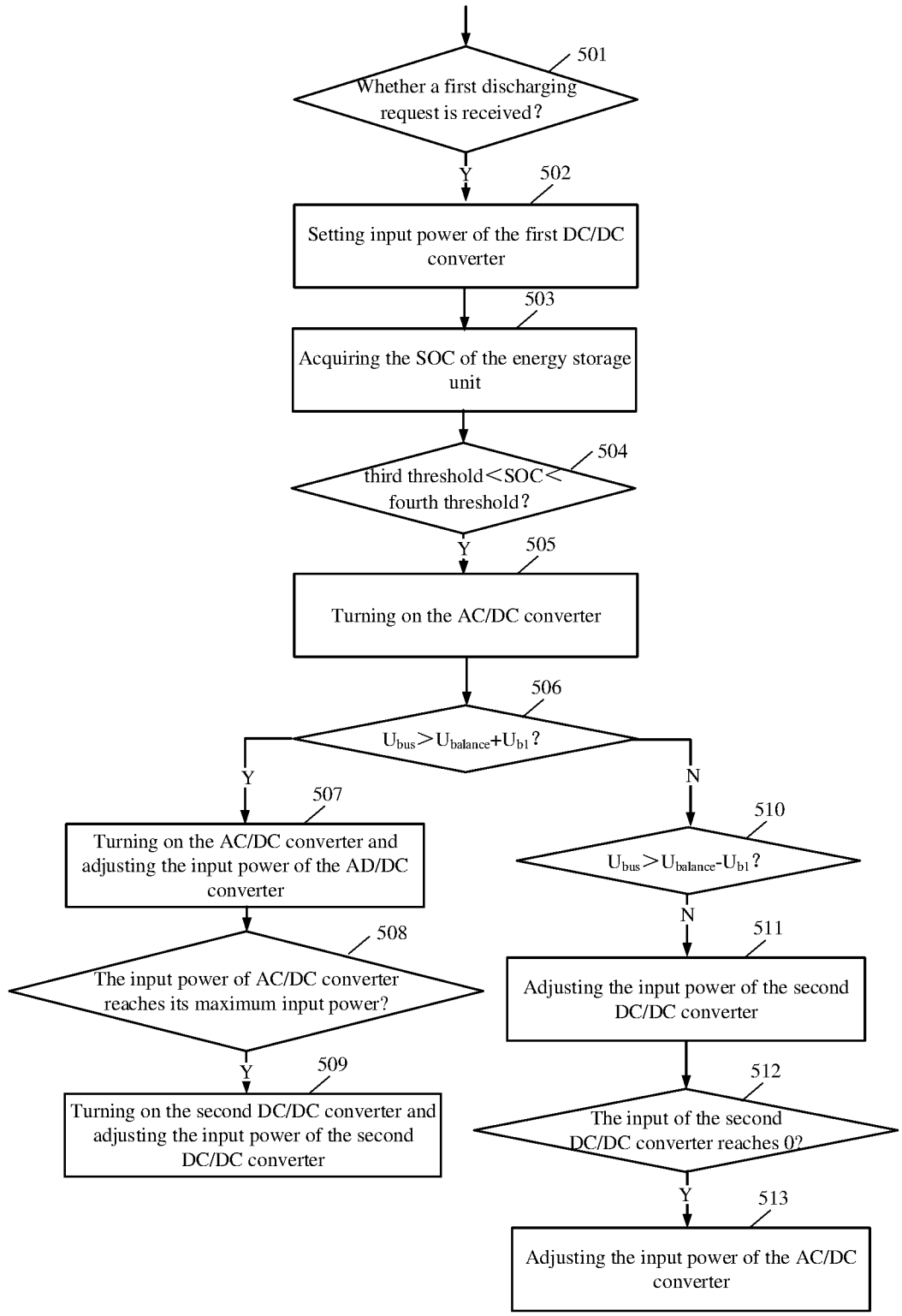
FIG. 5 is a schematic flowchart of battery discharging according to an embodiment of the present application.
Figure 6:
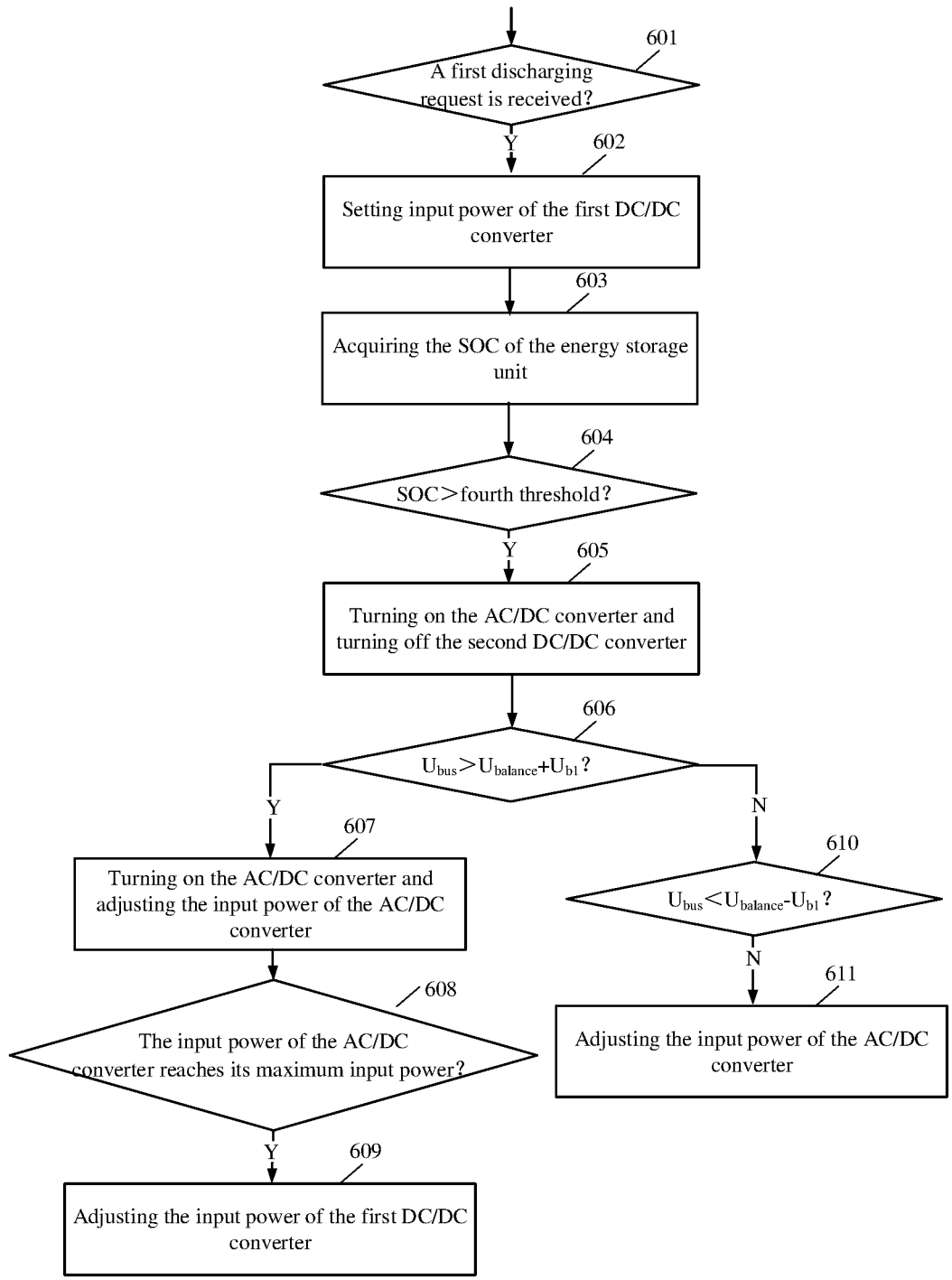
FIG. 6 is a schematic flowchart of battery discharging according to an embodiment of the present application.

Firstly, with reference to FIG. 4 to FIG. 6, the process of discharging from the battery to the energy storage unit 340 and/or the alternating current power supply is described.

Optionally, the control unit 210 may set the input power of the first DC/DC converter 320 as the first input power WDC/DC1-IN1 according to the first discharging voltage and the first discharging current which are transmitted by the BMS, acquire the SOC of the energy storage unit 340, and control the power conversion unit 130 according to the SOC of the energy storage unit 340 so as to release the power of the battery to the alternating current power supply and/or the energy storage unit 340.

The input power of the first DC/DC converter 320, for example, may be set to be equal to discharging requirement power WSUM1 of the battery, that is, WDC/DC1-IN1=WSUM1, where the discharging requirement power WSUM1 of the battery, for example, may be the product of the first discharging current and the first discharging voltage.

The control unit 210 needs to acquire a bus voltage Ubus of the charging and discharging device 200 in real time. For example, a detection circuit for detecting the bus voltage Ubus detects the bus voltage in real time and transmits the detected bus voltage Ubus to the control unit 210. The bus voltage Ubus may be detected in real time according to a certain frequency.

Case 1

The SOC of the energy storage unit 340 is less than a third threshold.

At this time, the second DC/DC converter 330 is turned on so as to release the power of the battery to the energy storage unit 340 through the first DC/DC converter 320 and the second DC/DC converter 330.

In an implementation, in the discharging process from the battery to the energy storage unit 340, if the bus voltage Ubus is greater than the bus balance voltage Ubalance and the difference between the bus voltage Ubus and the bus balance voltage Ubalance exceeds a preset value Ub1, the input power of the second DC/DC converter 330 is adjusted to the first input power WDC/DC2-IN1 of the second DC/DC converter 330, where the first input power WDC/DC2-IN1 of the second DC/DC converter 330 is less than or equal to the maximum input power PMAXDC/DC2-IN of the second DC/DC converter 330; and Where the difference between the bus voltage Ubus and the bus balance voltage Ubalance is less than or equal to the preset value Ub1 when the second DC/DC converter 330 works on the basis of the first input power WDC/DC2-IN1 of the second DC/DC converter 330.

In another implementation, in the discharging process from the power supply to the energy storage unit 340, if the bus voltage Ubus is greater than the bus balance voltage Ubalance and the difference between the bus voltage Ubus and the bus balance voltage Ubalance exceeds a preset value Ub1, the input power of the second DC/DC converter 330 is adjusted to the maximum input power PMAXDC/DC2-IN of the second DC/DC converter 330, the AC/DC converter 310 is turned on, and the input power of the AC/DC converter 310 is adjusted to the first input power WAC/DC-IN1 of the AC/DC converter 310, so that the power of the battery is released to the alternating current power supply at the same time through the AC/DC converter 310 and the first DC/DC converter 320.

Where when the second DC/DC converter 330 works on the basis of the maximum input power MAXDC/DC2-IN of the second DC/DC converter 330, and the AC/DC converter 310 works on the basis of the first input power WAC/DC-IN1 of the AC/DC converter 310, the bus balance voltage Ubalance and the difference between the bus voltage Ubus and the bus balance voltage Ubalance is less than or equal to the preset value Ub1.

Specifically, in the case 1, the SOC of the energy storage unit 340 is less than the third threshold, the second DC/DC converter 330 is turned on, and the power of the battery is preferentially released to the energy storage unit 340. In the discharging process from the battery to the energy storage unit 340, if Ubus>Ubalance+Ub1, the input power of the second DC/DC converter 330 is adjusted until |Ubus−Ubalance|<Ub1. If Ubus>Ubalance+Ub1 when the input power of the second DC/DC converter 330 is adjusted to the maximum input power PMAXDC/DC2-IN, the AC/DC converter 310 is turned on, so that the power of the battery is released to the alternating current power supply at the same time. The input power of the AC/DC converter 310 is increased from 0 until |Ubus−Ubalance|<Ub1.

In this way, when the SOC of the energy storage unit is smaller, the power of the battery is preferentially released to the energy storage unit so as to supplement the power stored in the energy storage unit; moreover, when the difference between the bus voltage and the bus balance voltage is larger, the power of the battery is released to the alternating current power supply at the same time, and the power released by the battery is received by the alternating current power supply and the energy storage unit, so that balance between the bus voltage and the bus balance voltage is maintained, and the charging and discharging device enables the battery to release the power in a stable state.

Optionally, the control unit 210 is further used to: receive a second discharging request transmitted by the BMS, the second discharging request including a second discharging voltage and a second discharging current; and set the input power of the first DC/DC converter as a second input power WDC/DC1-IN2 of the first DC/DC converter, where the second input power WDC/DC1-IN2 of the first DC/DC converter is less than the first input power WDC/DC1-IN1 of the first DC/DC converter.

It should be understood that the difference between the bus voltage Ubus and the bus balance voltage Ubalance cannot be still less than the preset value Ub1. For example, the discharging current and the discharging voltage in the discharging request may change at any time, so the bus voltage Ubus will also change. If the second discharging voltage and the second discharging current which are transmitted by the BMS are received, it is necessary to reset the input power of the first DC/DC converter 320. If the reset input power is reduced, the bus voltage Ubus may be reduced. At this time, it is necessary to correspondingly reduce the input power of the second DC/DC converter 230 and the AC/DC converter 210.

In one implementation, in the discharging process from the battery to the energy storage unit 340 and the alternating current power supply, if the bus voltage Ubus is less than the bus balance voltage Ubalance and the difference between the bus voltage and the bus balance voltage exceeds the preset value Ub1, the input power of the second DC/DC converter 330 is maintained as the maximum input power PMAXDC/DC2-IN of the second DC/DC converter, and the first input power WAC/DC-IN1 of the AC/DC converter 310 is adjusted to be reduced to the second input power WAC/DC-IN2 of the AC/DC converter.

Where When the second DC/DC converter 330 works on the basis of the maximum input power PMAXDC/DC2-IN of the second DC/DC converter 330, and the AC/DC converter works on the basis of the second input power WAC/DC-IN2 of the AC/DC converter, the difference between the bus voltage Ubus and the bus balance voltage Ubalance is less than or equal to the preset value Ub1.

In another implementation, if the bus voltage Ubus is less than the bus balance voltage Ubalance and the difference between the bus voltage Ubus and the bus balance voltage Ubalance exceeds the preset value Ub1, the first input power of the AC/DC converter 310 is adjusted to zero, and the input power of the second DC/DC converter 330 is adjusted from the maximum input power PMAXDC/DC2-IN of the second DC/DC converter 330 to the second input power WDC/DC2-IN2 of the second DC/DC converter 330.

Where the difference between the bus voltage Ubus and the bus balance voltage Ubalance is less than or equal to preset value Ub1 when the second DC/DC converter 330 works on the basis of the second input power WDC/DC2-IN2 of the second DC/DC converter 330.

It can be seen that when Ubalance-Ub1<Ubus<Ubalance+Ub1 (that is, |Ubus−Ubalance|<Ub1), the state and the input power of the second DC/DC converter 330 and the AC/DC converter 310 may be maintained unchanged; when Ubus Ubalance-Ub1, it is necessary to preferentially reduce the input power of the AC/DC converter 310; and if Ubus<Ubalance−Ub1 when the input power of the AC/DC converter 310 is reduced to 0, the input power of the second DC/DC converter 330 is reduced.

The following describes how to enable the battery to release power when the SOC of the energy storage unit 340 is less than the third threshold in detail below by taking FIG. 4 as an example. The flow 400 shown in FIG. 4 includes part or all of the following steps.

Step 401: it is detected whether the first discharging request transmitted by the BMS of the battery.

Where the first discharging request includes a first discharging current and a first discharging voltage.

If the first discharging request transmitted by the BMS is received, step 402 is performed.

Step 402: the input power of the first DC/DC converter 320 is set as the first input power WDC/DC1-IN1 of the first DC/DC converter 320 based on the first discharging voltage and the first discharging current.

For example, WDC/DC1-IN1 may be set to be equal to a product of the first discharging voltage and the first discharging current.

Step 403: the SOC of the energy storage unit 340 is acquired.

It should be understood that the performing time of the step 403 is not limited herein. FIG. 4 is only an example. The step 403 may be performed after the step 402, or may also be performed before the step 401 as long as the step 403 is performed before the step 404.

Step 404: it is determined whether the SOC of the energy storage unit 340 is less than the third threshold.

The third threshold may be set according to the characteristic of the energy storage unit, for example, it may be set as 10%, 20% or 30%.

Where in the step 404, if it is determined that the SOC of the energy storage unit 340 is less than the third threshold, step 405 is performed.

Step 405: the second DC/DC converter 330 is turned on.

The charging mode of the second DC/DC converter 330 is turned on, so the power of the battery may be released to the energy storage unit 340.

Step 406: it is determined whether Ubus>Ubalance+Ub1.

In the step 406, if it is determined that Ubus>Ubalance+Ub1, step 407 to step 409 are performed.

Step 407: the second DC/DC converter 330 is turned on and the input power of the second DC/DC converter is adjusted.

For example, the input power of the second DC/DC converter 330 is gradually increased from 0.

Step 408: it is determined whether the input power of the second DC/DC converter 330 reaches the maximum input power PMAXDC/DC2-IN of the second DC/DC converter 330.

The maximum input power PMAXDC/DC2-IN of the second DC/DC converter 330, for example, may be determined on the basis of the discharging capability of the energy storage unit 340. The more power the energy storage unit 340 can receive, the greater the maximum input power PMAXDC/DC2-IN of the second DC/DC converter 330 may be set.

The step 407 and the step 408 need to be performed concurrently, that is, the output power of the second DC/DC converter 330 is adjusted, and it is determined whether the input power of the second DC/DC converter 330 reaches the maximum input power PMAXDC/DC2-IN of the second DC/DC converter 330 in the adjustment process. Specifically, when the input power of the second DC/DC converter 330 is adjusted, the bus voltage Ubus is acquired in real time, and the adjustment of the input power of the second DC/DC converter 330 is stopped until |Ubus−Ubalance|<Ub1. At this time, if the input power of the second DC/DC converter 330 does not reach the maximum input power PMAXDC/DC2-IN of the second DC/DC converter 330, the AC/DC converter 310 is maintained in an off state. Assuming that the input power of the second DC/DC converter 330 is adjusted to the first input power WDC/DC2-IN1 of the second DC/DC converter 330 at this time, then |Ubus−Ubalance|<Ub1 when the second DC/DC converter 330 works on the basis of the first input power WDC/DC2-IN1.

That is, if |Ubus−Ubalance|<Ub1 when the input power of the second DC/DC converter 330 is not adjusted to the maximum input power PMAXDC/DC2-IN, it is unnecessary to turn on the AC/DC converter 310 again at this time.

However, if still Ubus>Ubalance+Ub1 when the input power of the second DC/DC converter 330 is adjusted to the maximum input power PMAXDC/DC2-IN, step 409 is performed.

Step 409: the AC/DC converter 310 is turned on and the input power of the AC/DC converter 310 is adjusted.

Since the AC/DC converter 310 starts the grid to vehicle (grid to vehicle, G2V) mode, at this time, the power of the battery may be released to the alternating current power supply at the same time. The control unit 210 adjusts the input power of the AC/DC converter 310 until |Ubus−Ubalance|<Ub1, and it is assumed that the input power of the AC/DC converter 310 is adjusted to the first input power WAC/DC-IN1 at this time. At this time, |Ubus−Ubalance|<Ub1 when the second DC/DC converter 330 works on the basis of the maximum input power PMAXDC/DC2-IN of the second DC/DC converter 330 and the AC/DC converter 310 works under the first input power WAC/DC-IN1 of the AC/DC converter 310.

In the step 406, if it is determined that Ubus<Ubalance+Ub1, step 410 to step 413 are performed.

Step 410: it is determined whether Ubus>Ubalance−Ub1.

If Ubalance−Ub<Ubus<Ubalance+Ub, the working state and the power of the AC/DC converter 310 and the second DC/DC converter 330 are maintained unchanged; and if Ubus<Ubalance−Ub1, step 411 and step 412 are performed.

Step 411: the input power of the AC/DC converter 310 is adjusted.

Step 412: it is determined whether the input power of the AC/DC converter 310 reaches 0.

It is necessary to perform the step 411 and the step 412 concurrently, that is, the input power of the AC/DC converter 310 is adjusted, and it is determined whether the input power of the AC/DC converter 310 is adjusted from the first input power WAC/DC-IN1 to 0 in the adjustment process. Specifically, when the input power of the AC/DC converter 310 is adjusted, the bus voltage Ubus is detected in real time, and the adjustment of the input power of the AC/DC converter 310 is stopped until |Ubus-Ubalance|<Ub1. At this time, if the input power of the AC/DC converter 310 does not reach 0, it is unnecessary to perform any adjustment on the second DC/DC converter 330. Assuming that the input power of the AC/DC converter 310 is the second input power WAC/DC-IN2 of the AC/DC converter 310, |Ubus−Ubalance|<Ub1 when the AC/DC converter 310 works on the basis of the second input power WAC/DC-IN2 and the second DC/DC converter 330 works on the basis of the maximum input power PMAXDC/DC2-IN.

That is, if |Ubus−Ubalance|<Ub1 when the input power of the AC/DC converter 310 is not adjusted to 0, it is unnecessary to adjust the input power of the second DC/DC converter 330 again at this time.

However, if Ubus<Ubalance−Ub1 when the input power of the AC/DC converter 310 is adjusted to 0, step 413 is performed.

Step 413: the input power of the second DC/DC converter 330 is adjusted.

The control unit 210 adjusts the input power of the second DC/DC converter 330 until |Ubus−Ubalance|<Ub1, and it is assumed that the input power of the second DC/DC converter 330 is adjusted to the second input power WDC/DC2-IN2 at this time. At this time, |Ubus−Ubalance|<Ub1 when the second DC/DC converter 330 works on the basis of the second input power WDC/DC2-IN2.

Case 2

The SOC of the energy storage unit 340 is greater than the third threshold and less than the fourth threshold.

At this time, the AC/DC converter 310 is turned on so as to release the power of the battery to the alternating current power supply through the first DC/DC converter 320 and the AC/DC converter 310.

In an implementation, in the process of releasing the power of the battery to the alternating current power supply, if the bus voltage Ubus is greater than the bus balance voltage Ubalance and the difference between the bus voltage Ubus and the bus balance voltage Ubalance exceeds the preset value Ub1, the input power of the AC/DC converter 310 is adjusted to a third input power WAC/DC-IN3 of the AC/DC converter 310, where the third input power WAC/DC-IN3 of the AC/DC converter 310 is less than or equal to the maximum input power PMAXAC/DC-IN of the AC/DC converter 310.

Where the difference between the bus voltage Ubus and the bus balance voltage Ubalance is less than or equal to the preset value Ub1 when the AC/DC converter 310 works on the basis of the third input power WAC/DC-IN3 of the AC/DC converter 310.

In another implementation, in the process of releasing the power of the battery to the alternating current power supply, if the bus voltage Ubus is greater than the bus balance voltage Ubalance and the difference between the bus voltage Ubus and the bus balance voltage Ubalance exceeds a preset value Ub1, the input power of the AC/DC converter 310 is adjusted to the maximum input power PMAXAC/DC-IN of the AC/DC converter 310, the second DC/DC converter 330 is turned on, and the input power of the second DC/DC converter 330 is adjusted to the third input power WDC/DC2-IN3 of the second DC/DC converter 330 so as to release the power of the battery to the energy storage unit 340 at the same time through the first DC/DC converter 320 and the second DC/DC converter 330.

Where when the AC/DC converter 310 works on the basis of the maximum input power PMAXAC/DC-IN of the AC/DC converter 310, and the second DC/DC converter 330 works on the basis of the third input power WDC/DC2-IN3 of the second DC/DC converter 330, the difference between the bus voltage Ubus and the bus balance voltage Ubalance is less than the preset value Ub1.

Specifically, in the case 2, the SOC of the energy storage unit 340 is greater than the third threshold and less than the fourth threshold, the second DC/DC converter 330 is turned on, and the power of the battery is preferentially released to the alternating current power supply. In the discharging process from the battery to the alternating current power supply, if Ubus>Ubalance+Ub1, the input power of the AC/DC converter 310 is adjusted until |Ubus−Ubalance|<Ub1. If Ubus>Ubalance+Ub1 when the input power of the AC/DC converter 310 is adjusted to the maximum input power PMAXAC/DC-IN, the second DC/DC converter 330 is turned on, so that the power of the battery is released to the energy storage unit 340 at the same time. The input power of the second DC/DC converter 330 is increased from 0 until |Ubus−Ubalance|<Ub1.

In this way, when the SOC of the energy storage unit is in an appropriate range, the power of the battery is preferentially released to the alternating current power supply so as to prevent the power stored in the energy storage unit from exceeding the capacity of the energy storage unit; moreover, when the difference between the bus voltage and the bus balance voltage is larger, the power of the battery is released to the energy storage unit at the same time, and the power released by the battery is jointly received by the energy storage unit and the alternating current power supply, so that balance between the bus voltage and the bus balance voltage is maintained, and the charging and discharging device enables the battery to release the power in a stable state.

Optionally, the control unit 210 is further used to: receive a third discharging request transmitted by the BMS, the third discharging request including a third discharging voltage and a third discharging current; and set the input power of the first DC/DC converter 320 as third input power WDC/DC1-IN3 of the first DC/DC converter 320, where the third input power WDC/DC1-IN3 of the first DC/DC converter 320 is less than the first input power WDC/DC1-IN1 of the first DC/DC converter.

It should be understood that the difference between the bus voltage Ubus and the bus balance voltage Ubalance cannot be still less than the preset value Ub1. For example, the discharging current and the discharging voltage in the discharging request may change at any time, so the bus voltage Ubus will also change. If the third discharging voltage and the third discharging current which are transmitted by the BMS are received, it is necessary to reset the input power of the first DC/DC converter 320. If the reset input power is reduced, the bus voltage Ubus may be reduced. At this time, it is necessary to correspondingly reduce the input power of the second DC/DC converter 230 and the AC/DC converter 210.

In one implementation, in the discharging process from the battery to the energy storage unit 340 and the alternating current power supply, if the bus voltage Ubus is less than the bus balance voltage Ubalance and the difference between the bus voltage and the bus balance voltage exceeds the preset value Ub1, the input power of the AC/DC converter 310 is maintained as the maximum input power PMAXAC/DC-IN of the AC/DC converter, and the third input power WDC/DC2-IN3 of the second DC/DC converter 330 is adjusted to be reduced to the fourth input power WDC/DC2-IN4 of the second DC/DC converter.

Where when the second DC/DC converter 330 works on the basis of the fourth input power WDC/DC2-IN3 of the second DC/DC converter, and the AC/DC converter 310 works on the basis of the maximum input power PMAXAC/DC-IN of the AC/DC converter 310, the difference between the bus voltage Ubus and the bus balance voltage Ubalance is less than or equal to the preset value U b1.

In another implementation, if the bus voltage Ubus is less than the bus balance voltage Ubalance and the difference between the bus voltage and the bus balance voltage exceeds the preset value Ub1, the third input power WDC/DC2-IN3 of the second DC/DC converter is adjusted to zero, and the input power of the AC/DC converter 310 is adjusted from the maximum input power PMAXAC/DC-IN of the AC/DC converter to the fourth input power WAC/DC-IN4 of the AC/DC converter.

Where when the AC/DC converter 310 works on the basis of the fourth input power WAC/DC-IN4 of the AC/DC converter 310, and the input power of the second DC/DC converter 330 is zero, the difference between the bus voltage Ubus and the bus balance voltage Ubalance is less than or equal to the preset value U b1.

It can be seen that when Ubalance−Ub1<Ubus<Ubalance+Ub1 (that is, |Ubus−Ubalance|<Ub1), the state and the input power of the second DC/DC converter 330 and the AC/DC converter 310 may be maintained unchanged; when Ubus<Ubalance−Ub1, it is necessary to preferentially reduce the input power of the second DC/DC converter 330; and if still Ubus<Ubalance−Ub1 when the input power of the second DC/DC converter 330 is reduced to 0, the input power of the AC/DC converter 310 is reduced.

The following describes how to enable the battery to release power when the SOC of the energy storage unit 340 is greater than the third threshold and less than the fourth threshold in detail below by taking FIG. 5 as an example. The flow 500 shown in FIG. 5 includes part or all of the following steps.

Step 501: it is detected whether the first discharging request transmitted by the BMS is received.

Where the first discharging request includes a first discharging current and a first discharging voltage.

If the first discharging request transmitted by the BMS is received, step 502 is performed.

Step 502: the input power of the first DC/DC converter 320 is set as the first input power WDC/DC1-IN1 of the first DC/DC converter 320 based on the first discharging voltage and the first discharging current.

For example, WDC/DC1-IN1 may be set to be equal to a product of the first discharging voltage and the first discharging current.

Step 503: the SOC of the energy storage unit 340 is acquired.

It should be understood that the performing time of the step 503 is not limited herein. FIG. 5 is only an example. The step 503 may be performed after the step 502, or may also be performed before the step 501 as long as the step 503 is performed before the step 504.

Step 504: it is determined whether the SOC of the energy storage unit 340 is greater than the third threshold and less than the fourth threshold.

The third threshold and the fourth threshold may be set according to the characteristic of the energy storage unit 340. For example, the third threshold may be set as 10%, 20% or 30%, and the fourth threshold may be set as 70%, 80% or 90%.

In the step 504, if it is determined that the SOC of the energy storage unit 340 is greater than the third threshold and less than the fourth threshold, step 505 is performed.

Step 505: the AC/DC converter 310 is turned on.

The G2V mode of the AC/DC converter 310 is turned on, so the power of the battery may be released to the energy storage unit 340.

Step 506: it is determined whether Ubus>Ubalance+Ub1.

In the step 506, if it is determined that Ubus>Ubalance+Ub1, step 507 to step 509 are performed.

Step 507: the AC/DC converter 310 is turned on and the input power of the AC/DC converter is adjusted.

For example, the input power of the AC/DC converter 310 is gradually increased from 0.

Step 508: it is determined whether the input power of the AC/DC converter 310 reaches the maximum input power PMAXAC/DC-IN of the AC/DC converter 310.

The step 507 and the step 508 need to be performed concurrently, that is, the output power of the AC/DC converter 310 is adjusted, and it is determined whether the input power of the AC/DC converter 310 reaches the maximum input power PMAXAC/DC-IN of the AC/DC converter 310 in the adjustment process. Specifically, when the input power of the AC/DC converter 310 is adjusted, the bus voltage Ubus is acquired in real time, and the adjustment of the input power of the AC/DC converter 310 is stopped until |Ubus−Ubalance|<Ub1. At this time, if the input power of the AC/DC converter 310 does not reach the maximum input power PMAXAC/DC-IN of the AC/DC converter 310, the second DC/DC converter 330 is maintained in an off state. Assuming that the input power of the AC/AC converter 310 is adjusted to the third input power WAC/DC-IN3 of the AC/DC converter 310, then |Ubus−Ubalance|<Ub1 when the AC/AC converter 310 works on the basis of the third input power WAC/DC-IN3.

That is, if |Ubus−Ubalance|<Ub1 when the input power of the AC/DC converter 310 is not adjusted to the maximum input power PMAXAC/DC-IN, it is unnecessary to turn on the second DC/DC converter 330 again at this time.

However, if still Ubus>Ubalance+Ub1 when the input power of the AC/DC converter 310 is adjusted to the maximum input power PMAXAC/DC-IN, step 509 is performed.

Step 509: the second DC/DC converter 330 is turned on and the input power of the second DC/DC converter 330 is adjusted.

The charging mode of the second DC/DC converter 330 is turned on, so the power of the battery may be released to the energy storage unit 340 at this time. The control unit 210 adjusts the input power of the second DC/DC converter 330 until |Ubus−Ubalance|<Ub1, and it is assumed that the input power of the second DC/DC converter 330 is adjusted to the third input power WDC/DC2-IN3 at this time. At this time, when the AC/DC converter 310 works on the basis of the maximum input power PMAXAC/DC-IN of the AC/DC converter 310, and the second DC/DC converter 330 works under the third output power WDC/DC2-IN3 of the second DC/DC converter 330, |Ubus−Ubalance|<Ub1.

In the step 506, if it is determined that Ubus<Ubalance+Ub1, step 510 to step 513 are performed.

Step 510: it is determined whether Ubus>Ubalance−Ub1.

If Ubalance−Ub<Ubus<Ubalance+Ub, the working state and the power of the second AC/DC converter 330 and the AC/DC converter 310 are maintained unchanged; and if Ubus<Ubalance−Ub1, it is necessary to perform step 511 and step 512.

Step 511: the input power of the second DC/DC converter 330 is adjusted.

Step 512: it is determined whether the input power of the second DC/DC converter 330 reaches 0.

The step 511 and the step 512 need to be performed concurrently, that is, the input power of the second DC/DC converter 330 is adjusted, and it is determined whether the input power of the second DC/DC converter 330 is adjusted from the third input power WDC/DC2-IN3 of second DC/DC converter 330 to 0 in the adjustment process. Specifically, when the input power of the second DC/DC converter 330 is adjusted, the bus voltage Ubus is detected in real time, and the adjustment of the input power of the second DC/DC converter 330 is stopped until |Ubus−Ubalance|<Ub1. At this time, if the input power of the second DC/DC converter 330 does not reach 0, it is unnecessary to perform any adjustment on the AC/DC converter 310. Assuming that the input power of the second DC/DC converter 330 is the fourth input power WDC/DC2-IN4 of the second DC/DC converter 330 at this time, then |Ubus−Ubalance|<Ub1 when the second DC/DC converter 330 works on the basis of the fourth input power WDC/DC2-IN4 and the AC/DC converter 310 works on the basis of the maximum input power PMAXAC/DC-IN.

That is, if |Ubus−Ubalance|U b1 when the input power of the second AC/DC converter 330 is not adjusted to 0, it is unnecessary to adjust the input power of the AC/DC converter 310 again at this time.

However, if still Ubus<Ubalance−Ub1 when the input power of the second DC/DC converter 330 is adjusted to 0, step 513 is performed.

Step 513: the input power of the AC/DC converter 310 is adjusted.

The control unit 210 adjusts the input power of the AC/DC converter 310 until |Ubus−Ubalance|<Ub1, and it is assumed that the input power of the AC/DC converter 310 is adjusted to the fourth input power WAC/DC-IN4 at this time. At this time, |Ubus−Ubalance|<Ub1 when the AC/DC converter 310 works on the basis of the fourth input power WAC/DC-IN4.

Case 3

The SOC of the energy storage unit 340 is greater than a fourth threshold.

At this time, the AC/DC converter 310 is turned on to release the power of the battery to the alternating current power supply through the first DC/DC converter 320 and the AC/DC converter 310, and the second DC/DC converter 330 is controlled to be turned off so as to prohibit from releasing the power of the battery to the energy storage unit 340 through the first DC/DC converter 320 and the second DC/DC converter 330.

In one implementation, in the process of releasing the power of the battery to the alternating current power supply, if the bus voltage Ubus is greater than the bus balance voltage Ubalance and the difference between the bus voltage Ubus and the bus balance voltage Ubalance exceeds a preset value Ub1, the input power of the AC/DC converter 310 is adjusted to fifth input power WAC/DC-IN5 of the AC/DC converter 310, where the fifth input power WAC/DC-IN5 of the AC/DC converter 310 is less than or equal to the maximum input power PMAXAC/DC-IN of the AC/DC converter 310.

Where the difference between the bus voltage Ubus and the bus balance voltage Ubalance is less than or equal to the preset value Ub1 when the AC/DC converter 310 works on the basis of the fifth input power WAC/DC-IN5 of the AC/DC converter 310.

In another implementation, in the process of releasing the power of the battery to the alternating current power supply, if the bus voltage Ubus is greater than the bus balance voltage Ubalance and the difference between the bus voltage Ubus and the bus balance voltage Ubalance exceeds the preset value Ub1, the input power of the AC/DC converter 310 is adjusted to the maximum input power PMAXAC/DC-IN of the AC/DC converter 310, and the input power of the first DC/DC converter 320 is set to be equal to the maximum input power PMAXAC/DC-IN of the AC/DC converter.

Specifically, in the case 3, the SOC of the energy storage unit 340 is greater than the fourth threshold, and the energy storage unit 340 cannot bear the excess power, so the AC/DC converter 310 is turned on, the power of the battery is only released to the alternating current power supply, and the second DC/DC converter 330 is controlled to be in an off state so as to prohibit from releasing the power of the battery to the energy storage unit 340. In the discharging process from the battery to the alternating current power supply, if Ubus>Ubalance+Ub1, the input power of the AC/DC converter 310 is adjusted until |Ubus−Ubalance|<Ub1. When the input power of the AC/DC converter 310 is adjusted to the maximum input power PMAXAC/DC-IN, the input power of the first DC/DC converter 320 is correspondingly adjusted to be equal to the maximum input power PMAXAC/DC-IN of the AC/DC converter 310, so that the battery is discharged to the alternating current power supply according to PMAXAC/DC-IN through the first DC/DC converter 320 and the AC/DC converter 310.

In this way, when the SOC of the energy storage unit is larger, the power of the battery is only released to the alternating current power supply, thereby preventing the power stored in the energy storage unit from exceeding the capacity of the energy storage unit.

Similarly, if Ubus<Ubalance−Ub1 due to the situation such as a change in the discharging current and/or the discharging voltage in the discharging request transmitted by the BMS, it is necessary to reduce the input power f the AC/DC converter 310.

The following describes how to enable the battery to release power when the SOC of the energy storage unit 340 is greater than the fourth threshold in detail below by taking FIG. 6 as an example. The flow 600 shown in FIG. 6 includes part or all of the following steps.

Step 601: it is detected whether the first discharging request transmitted by the BMS is received.

Where the first discharging request includes a first discharging current and a first discharging voltage.

If the first discharging request transmitted by the BMS is received, step 602 is performed.

Step 602: the input power of the first DC/DC converter 320 is set as the first input power WDC/DC1-IN1 of the first DC/DC converter 320 based on the first discharging voltage and the first discharging current.

For example, WDC/DC1-IN1 may be set to be equal to a product of the first discharging voltage and the first discharging current.

Step 603: the SOC of the energy storage unit 340 is acquired.

It should be understood that the performing time of the step 603 is not limited herein. FIG. 6 is only an example. The step 603 may be performed after the step 602, or may also be performed before the step 601 as long as the step 603 is performed before the step 604.

Step 604: it is determined whether the SOC of the energy storage unit 340 is greater than the fourth threshold.

The fourth threshold may be set according to the characteristic of the energy storage unit 340, for example, it may be set as 70%, 80% or 90%.

In the step 604, if it is determined that the SOC of the energy storage unit 340 is greater than the fourth threshold, step 605 is performed.

Step 605: the AC/DC converter 310 is turned on and the second DC/DC converter 330 is turned off.

The G2V mode of the AC/DC converter 310 is turned on, so the power of the battery may be released to the alternating current power supply. The second DC/DC converter 330 is turned off, so the power of the battery will not be released to the energy storage unit 340.

Step 606: whether Ubus>Ubalance+Ub1 is determined.

In the step 606, if it is determined that Ubus>Ubalance+Ub1, step 607 to step 609 are performed.

Step 607: the AC/DC converter 310 is turned on and the input power of the AC/DC converter is adjusted.

For example, the input power of the AC/DC converter 310 is gradually increased from 0.

Step 608: it is determined whether the input power of the AC/DC converter 310 reaches the maximum input power PMAXAC/DC-IN of the AC/DC converter 310.

The step 607 and the step 608 need to be performed concurrently, that is, the output power of the AC/DC converter 310 is adjusted, and it is determined whether the input power of the AC/DC converter 310 reaches the maximum input power PMAXAC/DC-IN of the AC/DC converter 310 in the adjustment process. Specifically, when the input power of the AC/DC converter 310 is adjusted, the bus voltage Ubus is acquired in real time, and the adjustment of the input power of the AC/DC converter 310 is stopped until |Ubus−Ubalance|U b1. At this time, if the input power of the AC/DC converter 310 does not reach the maximum input power PMAXAC/DC-IN of the AC/DC converter 310, the second DC/DC converter 330 is maintained in an off state. Assuming that the input power of the AC/DC converter 310 is adjusted to the fifth input power WAC/DC-IN5 of the AC/DC converter 310, |Ubus−Ubalance|<Ub1 when the AC/DC converter 310 works on the basis of the fifth input power WAC/DC-IN5 of the AC/DC converter 310.

That is, |Ubus−Ubalance|<Ub1 when the input power of the AC/DC converter 310 is not adjusted to the maximum input power PMAXAC/DC-IN. If Ubus>Ubalance+Ub1 when the input power of the AC/DC converter 310 is adjusted to the maximum input power PMAXAC/DC-IN, step 609 is performed.

Step 609: the input power of the first DC/DC converter 320 is adjusted.

The second DC/DC converter 330 is turned off, so Ubus>Ubalance+Ub1 even if the input power of the AC/DC converter 310 is adjusted to the maximum input power PMAXAC/DC-IN, and the power released by the battery cannot be received through the energy storage unit 340. At this time, the input power of the first DC/DC converter 320 only can be adjusted to be equal to the maximum input power PMAXAC/DC-IN of the AC/DC converter 310, so that the battery is discharged to the alternating current power supply according to PMAXAC/DC-IN through the first DC/DC converter 320 and the AC/DC converter 310.

In the step 606, if it is determined that Ubus<Ubalance+Ub1, step 610 is performed.

Step 610: it is determined whether Ubus>Ubalance−Ub1.

If Ubalance−Ub<Ubus<Ubalance+Ub, the working state and the power of the second AC/DC converter 330 and the AC/DC converter 310 are maintained unchanged; and if |Ubus−Ubalance|>Ub1, it is necessary to perform step 611.

Step 611: the input power of the AC/DC converter 330 is adjusted.

The control unit 210 adjusts the input power of the AC/DC converter 310 until |Ubus−Ubalance|<Ub1.

The process that the battery is discharged to the energy storage unit 340 and/or the alternating current power supply is described above with reference to FIG. 4 to FIG. 6, and the process of charging the battery through the energy storage unit 340 and/or the alternating current power supply is described below with reference to FIG. 7 to FIG. 9.

Optionally, the control unit 210 may firstly set the output power of the first DC/DC converter 320 as the first output power WDC/DC1-OUT1 based on the first charging voltage and the first charging current which are transmitted by the BMS, acquire the SOC of the energy storage unit 340, and control the power conversion unit 130 according to the SOC of the energy storage unit 340 so as to charge the battery through the alternating current power supply and/or the energy storage unit 340.

The output power of the first DC/DC converter 320, for example, may be set to be equal to the charging requirement power WSUM2 of the battery, that is, WDC/DC1-OUT1=WSUM2, the charging requirement power WSUM2 of the battery, for example, may be the product of the first charging current and the first charging voltage.

The control unit 210 needs to acquire a bus voltage Ubus of the charging and discharging device 200 in real time. For example, a detection circuit for detecting the bus voltage Ubus detects the bus voltage in real time and transmits the detected bus voltage Ubus to the control unit 210. The bus voltage Ubus may be detected in real time according to a certain frequency.

Case 1

The SOC of the energy storage unit 340 is greater than a first threshold.

At this time, the second DC/DC converter 330 is turned on so as to charge the battery by the energy storage unit 340 through the first DC/DC converter 320 and the second DC/DC converter 330.

In one implementation, in the process of charging the battery by the energy storage unit 340, if the bus voltage Ubus is less than the bus balance voltage Ubalance and the difference between the bus voltage Ubus and the bus balance voltage Ubalance exceeds a preset value Ub2, the output power of the second DC/DC converter 330 is adjusted to the first output power WDC/DC2-OUT1 of the second DC/DC converter 330, where the first output power WDC/DC2-OUT1 of the second DC/DC converter 330 is less than or equal to the maximum output power PMAXDC/DC2-OUT of the second DC/DC converter 330.

Where the difference between the bus voltage Ubus and the bus balance voltage Ubalance is less than or equal to the preset value Ub2 when the second DC/DC converter 330 works on the basis of the first output power WDC/DC2-OUT1 of the second DC/DC converter 330.

In another implementation, in the process of charging the battery by the energy storage unit 340, if the bus voltage Ubus is less than the bus balance voltage Ubalance and the difference between the bus voltage Ubus and the bus balance voltage Ubalance exceeds a preset value Ub2, the output power of the second DC/DC converter 330 is adjusted to the maximum output power PMAXDC/DC2-OUT of the second DC/DC converter 330, the AC/DC converter 310 is turned on, and the output power of the AC/DC converter 310 is adjusted to the first output power WAC/DC-OUT1 of the AC/DC converter 310 so as to charge the battery by the alternating current power supply at the same time through the AC/DC converter 310 and the first DC/DC converter 320.

Where when the second DC/DC converter 330 works on the basis of the maximum output power PMAXDC/DC2-OUT of the second DC/DC converter 330, and the AC/DC converter 310 works on the basis of the first output power WAC/DC-OUT1 of the AC/DC converter 310, the difference between the bus voltage Ubus and the bus balance voltage Ubalance is less than or equal to the preset value Ub2.

Specifically, in the case 1, the SOC of the energy storage unit 340 is greater than the first threshold, the second DC/DC converter 330 is turned on, and the battery is preferentially charged by the energy storage unit 340. In the process of charging the battery by the energy storage unit 340, if Ubus<Ubalance−Ub2, the output power of the second DC/DC converter 330 is adjusted until |Ubus−Ubalance|<Ub2. If still Ubus<Ubalance−Ub2 when the output power of the second DC/DC converter 330 is adjusted to the maximum PMAXDC/DC2-OUT, the AC/DC converter 310 is turned on, so that the battery is charged by the alternating current power supply at the same time. The output power of the AC/DC converter 310 is increased from 0 until |Ubus-Ubalance|<Ub2.

In this way, when the SOC of the energy storage unit is larger, the energy storage unit is preferentially used to charge the battery so as to release power stored in the energy storage unit and prepare for receiving the power released by the battery later; moreover, when the difference between the bus voltage and the bus balance voltage is larger, the alternating current power supply is turned on, and the battery is charged jointly by the alternating current power supply and the energy storage unit, so that balance between the bus voltage and the bus balance voltage is maintained, and the charging and discharging device can charge the battery in a stable state.

Optionally, the control unit 210 is further used to: receive a second charging request transmitted by the BMS, the second charging request including a second charging voltage and a second charging current; and set the output power of the first DC/DC converter as second output power WDC/DC1-OUT2 of the first DC/DC converter, where the second output power WDC/DC1-OUT2 of the first DC/DC converter is less than the first output power WDC/DC1-OUT1 of the first DC/DC converter.

It should be understood that the difference between the bus voltage Ubus and the bus balance voltage Ubalance cannot be still less than the preset value Ub2. The charging current and the charging voltage in the charging request may change at any time, so the bus voltage Ubus will also change. If the second discharging voltage and the second discharging current which are transmitted by the BMS are received, it is necessary to reset the output power of the first DC/DC converter 320. If the reset output power is reduced, the bus voltage Ubus may be increased. At this time, it is necessary to correspondingly reduce the output power of the second DC/DC converter 230 and the AC/DC converter 210.

In one implementation, in the process of charging the battery by the energy storage unit 340 and the alternating current power supply, if the bus voltage Ubus is greater than the bus balance voltage Ubalance and the difference between the bus voltage and the bus balance voltage exceeds the preset value Ub2, the output power of the second DC/DC converter 330 is maintained as the maximum output power PMAXDC/DC2-OUT of the second DC/DC converter, and the first output power WAC/DC-OUT1 of the AC/DC converter 310 is adjusted to be reduced to the second output power WAC/DC-OUT2 of the AC/DC converter.

Where when the second DC/DC converter 330 works on the basis of the maximum output power PMAXDC/DC2-OUT of the second DC/DC converter 330, and the AC/DC converter works on the basis of the second output power WAC/DC-OUT2 of the AC/DC converter, the difference between the bus voltage Ubus and the bus balance voltage Ubalance is less than or equal to the preset value Ub2.

In another implementation, if the bus voltage Ubus is greater than the bus balance voltage Ubalance and the difference between the bus voltage Ubus and the bus balance voltage Ubalance exceeds the preset value Ub2, the first output power of the AC/DC converter 310 is adjusted to zero, and the output power of the second DC/DC converter 330 is adjusted from the maximum output power PMAXDC/DC2-OUT of the second DC/DC converter 330 to the second output power WDC/DC2-OUT2 of the second DC/DC converter 330.

Where the difference between the bus voltage Ubus and the bus balance voltage Ubalance is less than or equal to the preset value Ub2 when the second DC/DC converter 330 works on the basis of the second output power WDC/DC2-OUT2 of the second DC/DC converter 330.

It can be seen that when Ubalance−Ub2<Ubus<Ubalance+Ub2 (that is, |Ubus−Ubalance|<Ub2), the state and the output power of the second DC/DC converter 330 and the AC/DC converter 310 may be maintained unchanged; when Ubus>Ubalance+Ub2, it is necessary to preferentially reduce the output power of the AC/DC converter 310; and if still Ubus>Ubalance+Ub2 when the output power of the AC/DC converter 310 is reduced to 0, the output power of the second DC/DC converter 330 is reduced.

The following describes how to charge the battery when the SOC of the energy storage unit 340 is greater than the first threshold in detail below by taking FIG. 7 as an example. The flow 700 shown in FIG. 7 includes part or all of the following steps.

Step 701: it is detected whether the first charging request transmitted by the BMS of the battery is received.

Where the first charging request includes a first charging current and a first charging voltage.

If the first charging request transmitted by the BMS is received, step 702 is performed.

Step 702: the output power of the first DC/DC converter 320 is set as the first output power WDC/DC1-OUT1 of the first DC/DC converter 320 based on the first charging voltage and the first charging current.

For example, WDC/DC1-OUT1 may be set to be equal to a product of the first charging voltage and the first charging current.

Step 703: the SOC of the energy storage unit 340 is acquired.

It should be understood that the performing time of the step 703 is not limited herein. FIG. 7 is only an example. The step 703 may be performed after the step 702, or may also be performed before the step 701 as long as the step 703 is performed before the step 704.

Step 704: it is determined whether the SOC of the energy storage unit 340 is greater than the first threshold.

The first threshold may be set according to the characteristic of the energy storage unit 340, for example, it may be may set as 70%, 80% or 90%.

Where in the step 704, if it is determined that the SOC of the energy storage unit 340 is greater than the first threshold, step 705 is performed.

Step 705: the second DC/DC converter 330 is turned on.

The discharging mode of the second DC/DC converter 330 is turned on, so the battery may be charged by the energy storage unit 340.

Step 706: it is determined whether Ubus<Ubalance−Ub2.

In the step 706, if it is determined that Ubus<Ubalance−Ub2, step 707 to step 709 are performed.

Step 707: the second DC/DC converter 330 is turned on and the output power of the second DC/DC converter is adjusted.

For example, the output power of the second DC/DC converter 330 is gradually increased from 0.

Step 708: it is determined whether the output power of the second DC/DC converter 330 reaches the maximum output power PMAXDC/DC2-OUT of the second DC/DC converter 330.

The maximum output power PMAXDC/DC2-OUT of the second DC/DC converter 330, for example, may be determined on the basis of the discharging capability of the energy storage unit 340. The more power the energy storage unit 340 can release, the greater the maximum output power PMAXDC/DC2-OUT of the second DC/DC converter 330 may be set.

The step 707 and the step 708 need to be performed concurrently, that is, the output power of the second DC/DC converter 330 is adjusted, and it is determined whether the output power of the second DC/DC converter 330 reaches the maximum output power PMAXDC/DC2-OUT of the second DC/DC converter 330 in the adjustment process. Specifically, when the output power of the second DC/DC converter 330 is adjusted, the bus voltage Ubus is acquired in real time, and the adjustment of the output power of the second DC/DC converter 330 is stopped until |Ubus−Ubalance|<Ub2. At this time, if the output power of the second DC/DC converter 330 does not reach the maximum output power PMAXDC/DC2-OUT of the second DC/DC converter 330, the AC/DC converter 310 is maintained in an off state. Assuming that the output power of the second DC/DC converter 330 is adjusted to the first output power WDC/DC2-OUT1 of the second DC/DC converter 330 at this time, then |Ubus−Ubalance|<Ub2 when the second DC/DC converter 330 works on the basis of the first output power WDC/DC2-OUT1.

That is, if |Ubus−Ubalance|<Ub2 when the output power of the second DC/DC converter 330 is not adjusted to the maximum output power PMAXDC/DC2-OUT, it is unnecessary to turn on the AC/DC converter 310 again at this time.

However, if still Ubus<Ubalance−Ub2 when the output power of the second DC/DC converter 330 is adjusted to the maximum output power PMAXDC/DC2-OUT, step 709 is performed.

Step 709: the AC/DC converter 310 is turned on and the output power of the AC/DC converter 310 is adjusted.

The V2G mode of the AC/DC converter 310 is turned on, so at this time, the battery may be charged by the alternating current power supply simultaneously. The control unit 210 adjusts the output power of the AC/DC converter 310 until |Ubus−Ubalance|<Ub2, and it is assumed that the output power of the AC/DC converter 310 is adjusted to the first output power WAC/DC-OUT1 at this time. At this time, |Ubus−Ubalance|<Ub2 when the second DC/DC converter 330 works on the basis of the maximum output power PMAXDC/DC2-OUT of the second DC/DC converter 330 and the AC/DC converter 310 works under the first output power WAC/DC-OUT1 of the AC/DC converter 310.

In the step 706, if it is determined that Ubus>Ubalance−Ub2, step 710 to step 713 are performed.

Step 710: it is determined whether Ubus<Ubalance+Ub2.

If Ubalance−Ub<Ubus<Ubalance+Ub, the working state and power of the AC/DC converter 310 and the second DC/DC converter 330 are maintained unchanged; and if Ubus>Ubalance+Ub2, step 711 and step 712 are performed.

Step 711: the output power of the AC/DC converter 310 is adjusted.

Step 712: it is determined whether the output power of the AC/DC converter 310 reaches 0.

The step 711 and the step 712 need to be perform concurrently, that is, the output power of the AC/DC converter 310 is adjusted, and it is determined whether the output power of the AC/DC converter 310 is adjusted from the first output power WAC/DC-OUT1 to 0 in the adjustment process. Specifically, when the output power of the AC/DC converter 310 is adjusted, the bus voltage Ubus is detected in real time, and the adjustment of the output power of the AC/DC converter 310 is stopped until |Ubus−Ubalance|<U b2. At this time, if the output power of the AC/DC converter 310 does not reach 0, it is unnecessary to perform any adjustment on the second DC/DC converter 330. Assuming that the output power of the AC/DC converter 310 is the second output power WAC/DC-OUT2 of the AC/DC converter 310 at this time, then |Ubus−Ubalance|<Ub2 when the AC/DC converter 310 works on the basis of the second output power WAC/DC-OUT2 and the second DC/DC converter 330 works on the maximum output power PMAXDC/DC2-OUT.

That is, if |Ubus−Ubalance|<Ub2 when the output power of the AC/DC converter 310 is not adjusted to 0, it is unnecessary to adjust the output power of the second DC/DC converter 330 again at this time.

However, if still Ubus>Ubalance+Ub2 when the output power of the AC/DC converter 310 is adjusted to 0, step 713 is performed.

Step 713: the output power of the second DC/DC converter 330 is adjusted.

The control unit 210 adjusts the output power of the second DC/DC converter 330 until |Ubus−Ubalance|<Ub2, and it is assumed that the output power of the second DC/DC converter 330 is adjusted to the second output power WDC/DC2-OUT2 at this time. At this time, |Ubus−Ubalance|<Ub2 when the second DC/DC converter 330 works on the basis of the second output power WDC/DC2-OUT2.

Case 2

The SOC of the energy storage unit 340 is greater than a second threshold and less than a first threshold.

At this time, the AC/DC converter 310 is turned on so as to charge the battery by the alternating current power supply through the first DC/DC converter 320 and the AC/DC converter 310.

In an implementation, in the process of charging the battery by the alternating current power supply, if the bus voltage Ubus is less than the bus balance voltage Ubalance and the difference between the bus voltage Ubus and the bus balance voltage Ubalance exceeds the preset value Ub2, the output power of the AC/DC converter 310 is adjusted to third output power WAC/DC-OUT3 of the AC/DC converter 310, where the third output power WAC/DC-OUT3 of the AC/DC converter 310 is less than or equal to the maximum output power PMAXAC/DC-OUT of the AC/DC converter 310.

Where the difference between the bus voltage Ubus and the bus balance voltage Ubalance is less than or equal to the preset value Ub2 when the AC/DC converter 310 works on the basis of the third output power WAC/DC-OUT3 of the AC/DC converter 310.

In another implementation, in the process of releasing the power of the battery to the alternating current power supply, if the bus voltage Ubus is less than the bus balance voltage Ubalance and the difference between the bus voltage Ubus and the bus balance voltage Ubalance exceeds a preset value Ub2, the output power of the AC/DC converter 310 is adjusted to the maximum output power PMAXAC/DC-OUT of the AC/DC converter 310, the second DC/DC converter 330 is turned on, and the output power of the second DC/DC converter 330 is adjusted to the third output power WDC/DC2-OUT3 of the second DC/DC converter 330 so as to charge the battery by the energy storage unit 340 at the same time through the first DC/DC converter 320 and the second DC/DC converter 330.

Where when the AC/DC converter 310 works on the basis of the maximum output power PMAXAC/DC-OUT of the AC/DC converter 310, and the second DC/DC converter 330 works on the basis of the third output power WDC/DC2-OUT3 of the second DC/DC converter 330, the difference between the bus voltage Ubus and the bus balance voltage Ubalance is less than the preset value Ub2.

Specifically, in the case 2, the SOC of the energy storage unit 340 is greater than the second threshold and less than the first threshold, the second DC/DC converter 330 is turned on, and the battery is preferentially charged by the alternating current power supply. In the process of charging the battery by the alternating current power supply, if Ubus<Ubalance−Ub2, the output power of the AC/DC converter 310 is adjusted until |Ubus−Ubalance|<Ub2. If still Ubus<Ubalance−Ub2 when the output power of the AC/DC converter 310 is adjusted to the maximum output power PMAXAC/DC-OUT, the second DC/DC converter 330 is turned on, so that the power of the battery is released to the energy storage unit 340 at the same time. The output power of the second DC/DC converter 330 is increased from 0 until |Ubus−Ubalance|<Ub2.

In this embodiment, when the SOC of the energy storage unit is in an appropriate range, the alternating current power supply is preferentially used to charge the battery; moreover, when the difference between the bus voltage and the bus balance voltage is larger, the energy storage unit is turned on, and the battery is charged jointly by the energy storage unit and the alternating current power supply, so that balance between the bus voltage and the bus balance voltage is maintained, and the charging and discharging device can charge the battery in a stable state.

Optionally, the control unit 210 is further used to: receive a third charging request transmitted by the BMS, the third charging request including a third charging voltage and a third charging current; and set the output power of the first DC/DC converter 320 as the third output power WDC/DC1-OUT3 of the first DC/DC converter 320 based on the third charging voltage and the third charging current, where the third output power WDC/DC1-OUT3 of the first DC/DC converter 320 is less than the first output power WDC/DC1-OUT1 of the first DC/DC converter 320.

It should be understood that the difference between the bus voltage Ubus and the bus balance voltage Ubalance cannot be still less than the preset value Ub2. The charging current and the charging voltage in the charging request may change at any time, so the bus voltage Ubus will also change. If the third discharging voltage and the third discharging current which are transmitted by the BMS are received, it is necessary to reset the output power of the first DC/DC converter 320. If the reset output power is reduced, the bus voltage Ubus may be increased. At this time, it is necessary to correspondingly reduce the output power of the second DC/DC converter 230 and the AC/DC converter 210.

In one implementation, in the charging process from the battery to the energy storage unit 340 and the alternating current power supply, if the bus voltage Ubus is less than the bus balance voltage Ubalance and the difference between the bus voltage Ubus and the bus balance voltage Ubalance exceeds a preset value Ub2, the output power of the AC/DC converter 310 is maintained as the maximum output power PMAXAC/DC-OUT of the AC/DC converter, and the third output power WDC/DC2-OUT3 of the second DC/DC converter 330 is reduced to the fourth output power WDC/DC2-OUT4 of the second DC/DC converter.

Where when the second DC/DC converter 330 works on the basis of the fourth output power WDC/DC2-OUT3 of the second DC/DC converter, and the AC/DC converter 310 works on the basis of the maximum output power PMAXAC/DC-OUT of the AC/DC converter 310, the difference between the bus voltage Ubus and the bus balance voltage Ubalance is less than or equal to the preset value Ub2.

In another implementation, if the bus voltage Ubus is less than the bus balance voltage Ubalance and the difference between the bus voltage Ubus and the bus balance voltage Ubalance exceeds a preset value Ub2, the third output power WDC/DC2-OUT3 of the second DC/DC converter is adjusted to zero, and the output power of the AC/DC converter 310 is adjusted from the maximum output power PMAXAC/DC-OUT of the AC/DC converter to the fourth output power WAC/DC-OUT4 of the AC/DC converter.

Where when the AC/DC converter 310 works on the basis of the fourth output power WAC/DC-OUT4 of the AC/DC converter 310, and the output power of the second DC/DC converter 330 is zero, the difference between the bus voltage Ubus and the bus balance voltage Ubalance is less than or equal to the preset value Ub2.

It can be seen that when Ubalance−Ub2<Ubus<Ubalance+Ub2 (that is, |Ubus−Ubalance|<Ub2), the state and the output power of the second DC/DC converter 330 and the AC/DC converter 310 may be maintained unchanged; when Ubus>Ubalance+Ub2, it is necessary to preferentially reduce the output power of the second DC/DC converter 330; and if still Ubus>Ubalance+Ub2 when the output power of the second DC/DC converter 330 is reduced to 0, the output power of the AC/DC converter 310 is then reduced.

The following describes how to charge the battery when the SOC of the energy storage unit 340 is greater than the second threshold and less than the first threshold in detail below by taking FIG. 8 as an example. The flow 800 shown in FIG. 8 includes part or all of the following steps.

Step 801: it is detected whether the first charging request transmitted by the BMS of the battery is received.

Where the first charging request includes a first charging current and a first charging voltage.

If the first charging request transmitted by the BMS is received, step 802 is performed.

Step 802: the output power of the first DC/DC converter 320 is set as the first output power WDC/DC1-OUT1 of the first DC/DC converter 320 based on the first charging voltage and the first charging current.

For example, WDC/DC1-OUT1 may be set to be equal to a product of the first charging voltage and the first charging current.

Step 803: the SOC of the energy storage unit 340 is acquired.

It should be understood that the performing time of the step 803 is not limited herein. FIG. 8 is only an example. The step 803 may be performed after the step 802, or may also be performed before the step 801 as long as the step 803 is performed before the step 804.

Step 804: it is determined whether the SOC of the energy storage unit 340 is greater than the second threshold and less than the first threshold.

The first threshold and the second threshold may be set according to the characteristic of the energy storage unit 340. For example, the second threshold may be set as 10%, 20% or 30%, and the first threshold may be set as 70%, 80% or 90%.

In the step 804, if it is determined that the SOC of the energy storage unit 340 is greater than the second threshold and less than the first threshold, step 805 is performed.

Step 805: the AC/DC converter 310 is turned on.

The V2G mode of the AC/DC converter 310 is turned on, so the battery may be charged by the energy storage unit 340.

Step 806: it is determined whether Ubus<Ubalance−Ub2.

In the step 806, if it is determined that Ubus<Ubalance−Ub2, step 807 to step 809 are performed.

Step 807: the AC/DC converter 310 is turned on and the output power of the AC/DC converter is adjusted.

For example, the output power of the AC/DC converter 310 is gradually increased from 0.

Step 808: it is determined whether the output power of the AC/DC converter 310 reaches the maximum power PMAXAC/DC-OUT of the AC/DC converter 310.

The step 807 and the step 808 need to be performed concurrently, that is, the output power of the AC/DC converter 310 is adjusted, and it is determined whether the output power of the AC/DC converter 310 reaches the maximum output power PMAXAC/DC-OUT of the AC/DC converter 310 in the adjustment process.

Specifically, when the output power of the AC/DC converter 310 is adjusted, the bus voltage Ubus is acquired in real time, and the adjustment of the output power of the AC/DC converter 310 is stopped until |Ubus−Ubalance|<U b2. At this time, if the output power of the AC/DC converter 310 does not reach the maximum output power PMAXAC/DC-OUT of the AC/DC converter 310, the second DC/DC converter 330 is maintained in an off state. Assuming that the output power of the AC/AC converter 310 is adjusted to the third output power WAC/DC-OUT3 of the AC/DC converter 310, then |Ubus−Ubalance|<Ub2 when the AC/AC converter 310 works on the basis of the third output power WAC/DC-OUT3.

That is, if |Ubus−Ubalance|<Ub2 when the output power of the AC/DC converter 310 is not adjusted to the maximum output power PMAXAC/DC-OUT, it is unnecessary to turn on the second DC/DC converter 330 again at this time.

However, if still Ubus<Ubalance−U b2 when the output power of the AC/DC converter 310 is adjusted to the maximum output power PMAXAC/DC-OUT, step 809 is performed.

Step 809: the second DC/DC converter 330 is turned on and the output power of the second DC/DC converter 330 is adjusted.

The discharging mode of the second DC/DC converter 330 is turned on, so the battery may be charged by the energy storage unit 340 at the same time. The control unit 210 adjusts the output power of the second DC/DC converter 330 until |Ubus−Ubalance|<Ub2, and it is assumed that the output power of the second DC/DC converter 330 is adjusted to the third output power WDC/DC2-OUT3 at this time. At this time, |Ubus−Ubalance|<Ub2 when the AC/DC converter 310 works on the basis of the maximum output power PMAXAC/DC-OUT of the AC/DC converter 310 and the second DC/DC converter 330 works under the third output power WDC/DC2-OUT3 of the second DC/DC converter 330.

In the step 806, if it is determined that Ubus>Ubalance−Ub2, step 810 to step 813 are performed.

Step 810: it is determined whether Ubus<Ubalance+Ub2.

If Ubalance−Ub<Ubus<Ubalance+Ub, the working state and power of the second DC/DC converter 330 and the AC/DC converter 310 are maintained unchanged; and if Ubus>Ubalance+Ub2, it is necessary to perform step 811 and step 812.

Step 811: the output power of the second DC/DC converter 330 is adjusted.

Step 812: it is determined whether the output power of the second DC/DC converter 330 reaches 0.

The step 811 and the step 812 need to be performed concurrently, that is, the output power of the second DC/DC converter 330 is adjusted, and it is determined whether the output power of the second DC/DC converter 330 is adjusted from the third output power WDC/DC2-OUT3 to 0 in the adjustment process. Specifically, when the output power of the second DC/DC converter 330 is adjusted, the bus voltage Ubus is detected in real time, and the adjustment of the output power of the second DC/DC converter 330 is stopped until |Ubus−Ubalance|<Ub2. At this time, if the output power of the second DC/DC converter 330 does not reach 0, it is unnecessary to perform any adjustment on the AC/DC converter 310. Assuming that the output power of the second DC/DC converter 330 is the fourth output power WDC/DC2-OUT4 of the second DC/DC converter 330 at this time, |Ubus−Ubalance|<Ub2 when the second DC/DC converter 330 works on the basis of the fourth output power WDC/DC2-OUT4 and the AC/DC converter 310 works on the basis of the maximum output power PMAXAC/DC-OUT.

That is, if |Ubus−Ubalance|<U b2 when the output power of the second DC/DC converter 330 is not adjusted to 0, it is unnecessary to adjust the output power of the AC/DC converter 310 again at this time.

However, if still Ubus>Ubalance+Ub2 when the output power of the second DC/DC converter 330 is adjusted to 0, step 813 is performed.

Step 813: the output power of the AC/DC converter 310 is adjusted.

In the step 813, the control unit 210 adjusts the output power of the AC/DC converter 310 until |Ubus−Ubalance|<Ub2, and it is assumed that the output power of the AC/DC converter 310 is adjusted to the output power WAC/DC-OUT4 at this time. At this time, |Ubus−Ubalance|<U b2 when the AC/DC converter 310 works on the basis of the fourth output power WAC/DC-OUT4.

Case 3

The SOC of the energy storage unit 340 is less than a second threshold.

At this time, the AC/DC converter 310 is turned on to charge the battery by the alternating current power supply through the first DC/DC converter 320 and the AC/DC 310, and the second DC/DC converter 330 is controlled to be turned off so as to prohibit from charging the battery by the energy storage unit 340 through the first DC/DC converter 320 and the second DC/DC converter 330.

In an implementation, in the process of charging the battery by the alternating current power supply, if the bus voltage Ubus is less than the bus balance voltage Ubalance and the difference between the bus voltage Ubus and the bus balance voltage Ubalance exceeds the preset value Ub2, the output power of the AC/DC converter 310 is adjusted to fifth output power WAC/DC-OUT5 of the AC/DC converter 310, where the fifth output power WAC/DC-OUT5 of the AC/DC converter 310 is less than or equal to the maximum output power PMAXAC/DC-OUT of the AC/DC converter 310.

Where the difference between the bus voltage Ubus and the bus balance voltage Ubalance is less than or equal to the preset value Ub2 when the AC/DC converter 310 works on the basis of the fifth output power WAC/DC-OUT5 of the AC/DC converter 310.

In another implementation, in the process of charging the battery by the alternating current power supply, if the bus voltage Ubus is less than the bus balance voltage Ubalance and the difference between the bus voltage Ubus and the bus balance voltage Ubalance exceeds the preset value Ub2, the output power of the AC/DC converter 310 is adjusted to the maximum output power PMAXAC/DC-OUT of the AC/DC converter 310, and the output power of the first DC/DC converter 320 is set to be equal to the maximum output power PMAXAC/DC-OUT of the AC/DC converter.

Specifically, in the case 3, the SOC of the energy storage unit 340 is less than the second threshold, and the energy storage unit 340 does not have the excess power for charging the battery, so the AC/DC converter 310 is turned on, the battery is charged by the alternating current power supply, and the second DC/DC converter 330 is controlled to be in an off state so as to prohibit from charging the battery by the energy storage unit 340. In the process of charging the battery by the alternating current power supply, if Ubus<Ubalance−Ub2, the output power of the AC/DC converter 310 is adjusted until |Ubus−Ubalance|<Ub2. When the output power of the AC/DC converter 310 is adjusted to the maximum output power PMAXAC/DC-OUT, the output power of the first DC/DC converter 320 is correspondingly adjusted to be equal to the maximum output power PMAXAC/DC-OUT of the AC/DC converter 310, so that the battery is charged by the alternating current power supply according to PMAXAC/DC-OUT through the first DC/DC converter 320 and the AC/DC converter 310.

In this embodiment, when the SOC of the energy storage unit is smaller, the battery is charged only by the alternating current power supply, so that the power stored in the energy storage unit is saved.

Similarly, the change of the charging current and/or the charging voltage in the charging request transmitted by the BMS, which may lead to Ubus>Ubalance+Ub2. At this time, the alternating current power supply may also be used to charge the energy storage unit 340.

Optionally, the control unit 210 is further used to: receive a fourth charging request transmitted by the BMS, the fourth charging request including a fourth charging voltage and a fourth charging current; and set the output power of the first DC/DC converter 320 as the fourth output power WDC/DC1-OUT4 of the first DC/DC converter 320 based on the fourth charging voltage and the fourth charging current, where the fourth output power WDC/DC1-OUT4 of the first DC/DC converter 320 is less than the first output power WDC/DC1-OUT1 of the first DC/DC converter 320.

Where in the process of charging the battery by the alternating current power supply, if the bus voltage Ubus is greater than the bus balance voltage Ubalance and the difference between the bus voltage Ubus and the bus balance voltage Ubalance is greater than the preset value Ub2, the second DC/DC converter 330 is turned on to charge the energy storage unit 340 through the alternating current power supply.

In this way, in addition to charging the battery, the alternating current power supply may also charge the energy storage unit 340 when the SOC of the energy storage unit 340 is smaller so as to supplement the power stored in the energy storage unit 340.

The following describes how to charge the battery when the SOC of the energy storage unit 340 is less than the second threshold in detail below by taking FIG. 9 as an example. The flow 900 shown in FIG. 9 includes part or all of the following steps.

Step 901: it is detected whether the first charging request transmitted by the BMS of the battery is received.

Where the first charging request includes a first charging current and a first charging voltage.

If the first charging request transmitted by the BMS is received, step 902 is performed.

Step 902: the output power of the first DC/DC converter 320 is set as the first output power WDC/DC1-OUT1 of the first DC/DC converter 320 based on the first charging voltage and the first charging current.

For example, WDC/DC1-OUT1 may be set to be equal to a product of the first charging voltage and the first charging current.

Step 903: the SOC of the energy storage unit 340 is acquired.

It should be understood that the performing time of the step 903 is not limited herein. FIG. 9 is only an example. The step 903 may be performed after the step 902, or may also be performed before the step 901 as long as the step 903 is performed before the step 904.

Step 904: it is determined whether the SOC of the energy storage unit 340 is less than the second threshold.

The second threshold may be set according to the characteristic of the energy storage unit 340, for example, it may be set as 10%, 20% or 30%.

In the step 904, if it is determined that the SOC of the energy storage unit 340 is less than the second threshold, step 905 is performed.

Step 905: the AC/DC converter 310 is turned on and the second DC/DC converter 330 is turned off.

The V2G mode of the AC/DC converter 310 is turned on, so the alternating current power supply may charge the battery. The second DC/DC converter 330 is turned off, so the energy storage unit 340 will not charge the battery.

Step 906: it is determined whether Ubus<Ubalance−Ub2.

In the step 906, if it is determined that Ubus<Ubalance−Ub2, step 907 to step 909 are performed.

Step 907: the AC/DC converter 310 is turned on and the output power of the AC/DC converter is adjusted.

For example, the output power of the AC/DC converter 310 is gradually increased from 0.

Step 908: it is determined whether the output power of the AC/DC converter 310 reaches the maximum power PMAXAC/DC-OUT of the AC/DC converter 310.

The step 907 and the step 908 need to be performed concurrently, that is, the output power of the AC/DC converter 310 is adjusted, and it is determined whether the output power of the AC/DC converter 310 reaches the maximum output power PMAXAC/DC-OUT of the AC/DC converter 310 in the adjustment process. Specifically, when the output power of the AC/DC converter 310 is adjusted, the bus voltage Ubus is acquired in real time, and the adjustment of the output power of the AC/DC converter 310 is stopped until |Ubus−Ubalance|<U b2. At this time, if the output power of the AC/DC converter 310 does not reach the maximum output power PMAXAC/DC-OUT of the AC/DC converter 310, the second DC/DC converter 330 is maintained in an off state. Assuming that the output power of the AC/DC converter 310 is adjusted to the fifth output power WAC/DC-OUT5 of the AC/DC converter 310, then |Ubus−Ubalance|<Ub2 when the AC/DC converter 310 works on the basis of the fifth output power WAC/DC-OUT5.

That is, |Ubus−Ubalance|<Ub2 when the output power of the AC/DC converter 310 is not adjusted to the maximum output power PMAXAC/DC-OUT. If still Ubus<Ubalance−U b2 when the output power of the AC/DC converter 310 is adjusted to the maximum output power PMAXAC/DC-OUT, step 909 is performed.

Step 909: the output power of the first DC/DC converter 320 is adjusted.

The second DC/DC converter 330 is turned off, so Ubus<Ubalance−Ub2 even if the output power of the AC/DC converter 310 is adjusted to the maximum output power PMAXAC/DC-OUT, and the battery cannot be charged by the energy storage unit 340. At this time, the output power of the first DC/DC converter 320 can only be adjusted to the maximum output power PMAXAC/DC-OUT of the AC/DC converter 310, so that the alternating current power supply charges the battery according to PMAXAC/DC-OUT through the first DC/DC converter 320 and the AC/DC converter 310.

In the step 906, if it is determined that Ubus>Ubalance−Ub2, step 910 is performed.

Step 910: it is determined whether Ubus<Ubalance+U b.

If Ubalance−Ub2<Ubus<Ubalance+Ub2 (that is, |Ubus−Ubalance|<Ub2), the working state and power of the second DC/DC converter 330 and the AC/DC converter 310 are maintained unchanged; and if Ubus>Ubalance+Ub2, step 911 is performed.

Step 911: the output power of the AC/DC converter 330 is adjusted.

In the step 911, the control unit 210 adjusts the output power of the AC/DC converter 310 until |Ubus−Ubalance|<Ub2.

It should be noted that in the embodiment of the present application, the input power and the output power of the bidirectional AC/DC converter 310, the first DC/DC converter 320 and the second DC/DC converter 330 during working cannot exceed their own maximum input power and maximum output power.

The embodiment of the present application does not limit the adjustment mode on the output power of the second DC/DC converter 330 and the AC/DC converter 310. For example, the output power or the input power of the AC/DC converter 1610 or the second DC/DC converter 330 may be gradually increased or reduced according to a preset step length.

Figure 7:
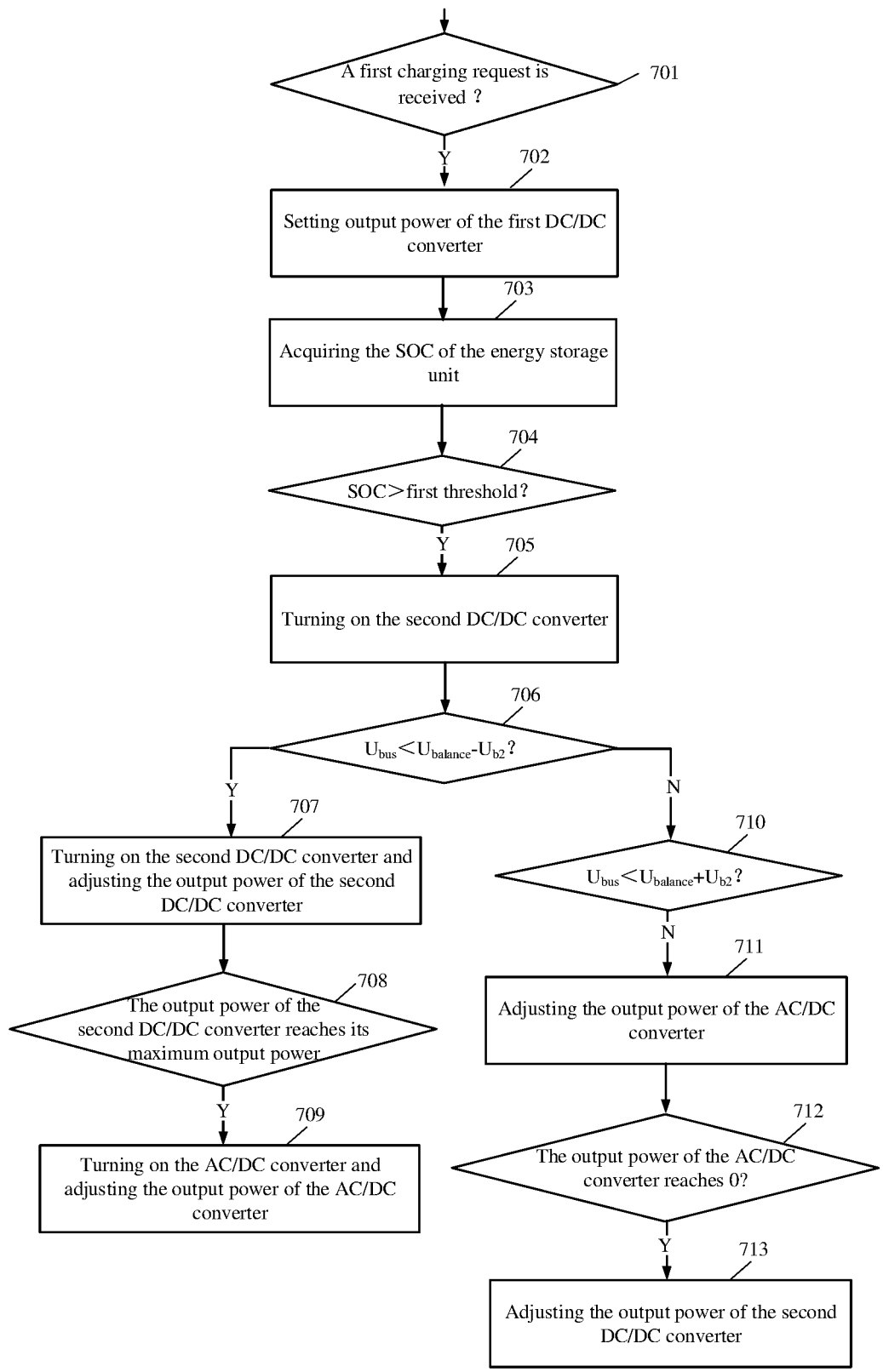
FIG. 7 is a schematic flowchart of battery charging according to an embodiment of the present application.
Figure 8:
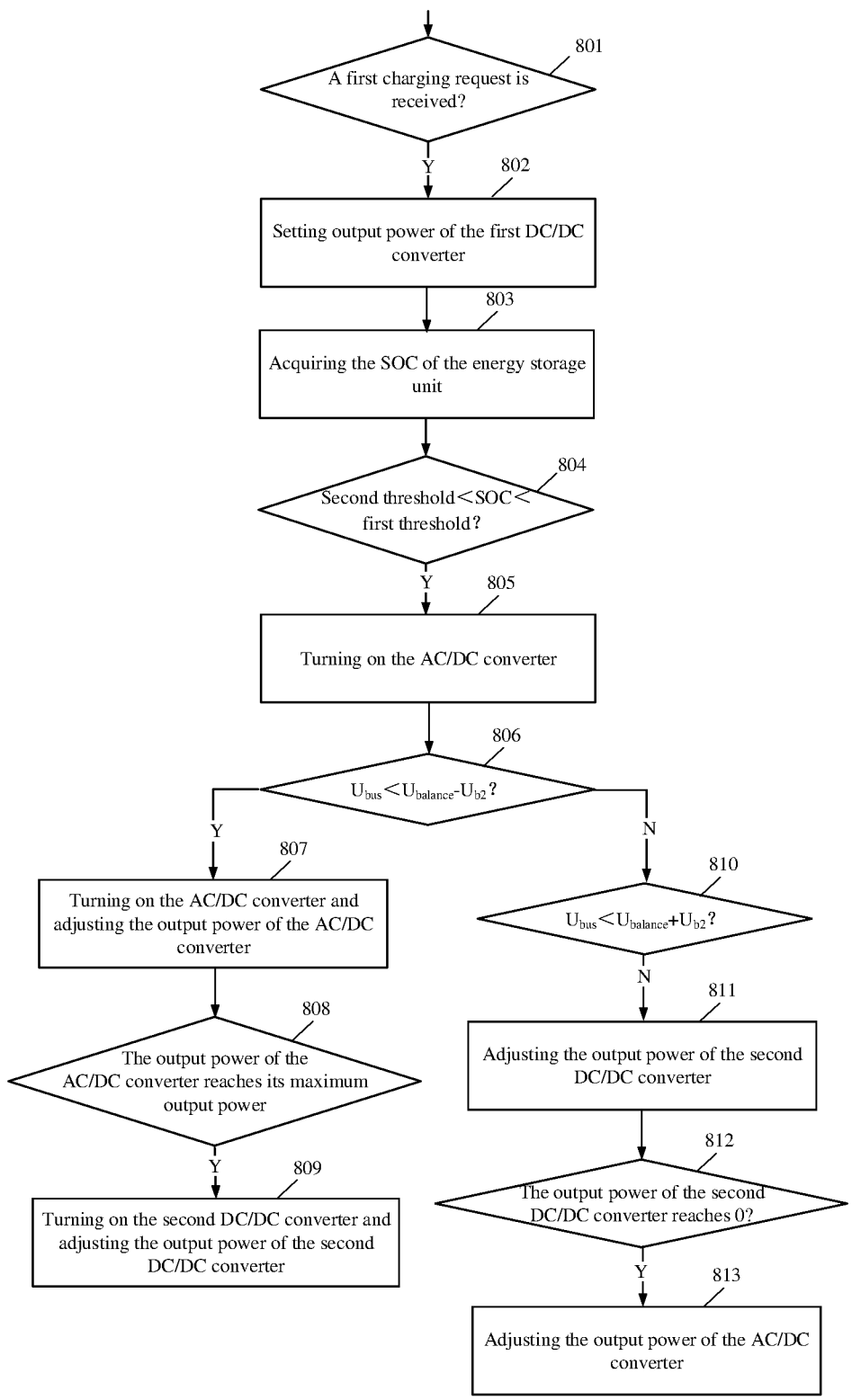
FIG. 8 is a schematic flowchart of battery charging according to an embodiment of the present application.
Figure 9:
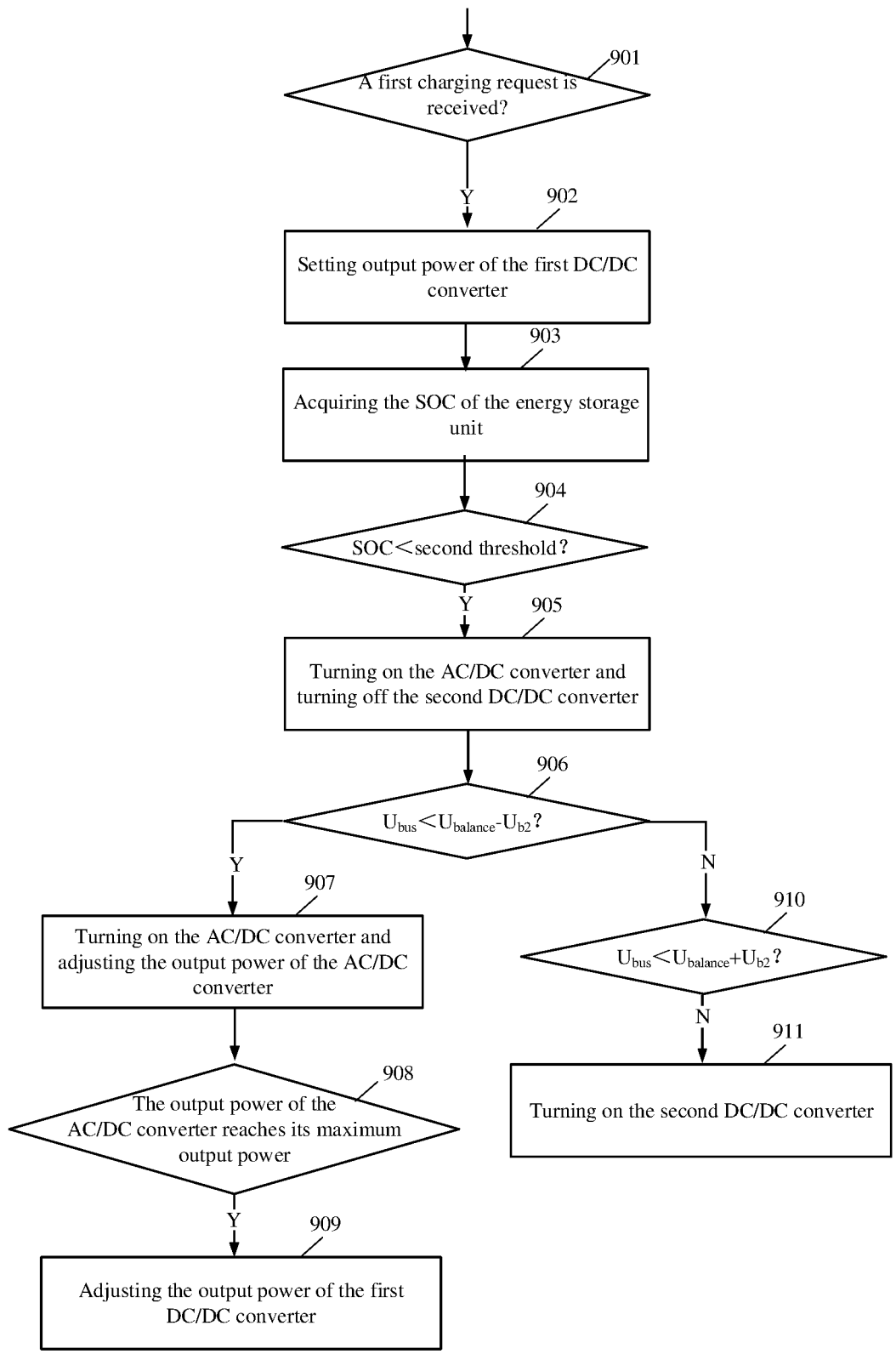
FIG. 9 is a schematic flowchart of battery charging according to an embodiment of the present application.

It should be understood that the flows shown in FIG. 4 to FIG. 6 may be performed separately, that is, the charging and discharging device is only used to discharge the battery; the flows shown in FIG. 7 to FIG. 9 may be performed separately, that is, the charging and discharging device is only used to charge the battery; and the flows shown in FIG. 4 to FIG. 6 and the flows shown in FIG. 7 to FIG. 9 may also be performed in a combined manner, that is, the charging and discharging device may be used to discharge the battery and may also be used to charge the battery. The present application is not limited to this.

It should also be understood that in the above-mentioned discharging and charging process described in FIG. 4 to FIG. 9, the situations described in any branch may be performed separately without depending on the solution described in other branches; and the situations described in different branches may also be combined. For example, for the battery discharging process, the case where the SOC of the energy storage unit 340 is less than the third threshold shown in FIG. 4 is taken as an example. At this time, when it is found that Ubus>Ubalance+Ub1, the input power of the second DC/DC converter 330 and the input power of the AC/DC converter 310 are sequentially increased according to the order (where the input power of the AC/DC converter 310 is increased only when the input power of the second DC/DC converter 330 has reached its maximum input power) until |Ubus−Ubalance|<Ub1; when it is found that Ubus<Ubalance−Ub1, the input power of the second DC/DC converter 330 and the input power of the AC/DC converter 310 are sequentially reduced according to the order (where the input power of the second DC/DC converter 330 is reduced only when the input power of the AC/DC converter 310 has reached to 0) until |Ubus−Ubalance|<Ub1; and if it is detected that |Ubus−Ubalance|<Ub1, the current state and power of the second DC/DC converter 330 and the AC/DC converter 310 are maintained unchanged.

In addition to the situations described above, when the control unit 210 does not receive the first charging request and does not acquire the SOC of the energy storage unit 340 when receiving the first charging request. If the SOC of the energy storage unit 340 is greater than a fifth threshold and less than a sixth threshold, the AC/DC converter 310, the first DC/DC converter 320 and the second DC/DC converter 330 are controlled to be turned off. Otherwise, only the first DC/DC converter 320 is controlled to be turned off. At this time, if the SOC of the energy storage unit 340 is less than the fifth threshold, the charging mode of the second DC/DC converter 330 and the G2V mode of the AC/DC converter 310 are sequentially turned on, the operating power of the second DC/DC converter and the AC/DC converter are set as the maximum input power of the second DC/DC converter 330, so that the energy storage unit 340 is charged by the alternating current power supply; and if the SOC of the energy storage unit 340 is greater than the sixth threshold, the discharging mode of the second DC/DC converter 330 and the V2G mode of the AC/DC converter 310 are sequentially turned on, and the operating power of the second DC/DC converter 330 and the AC/DC converter 310 are both set as the maximum output power of the second DC/DC converter 330, thereby discharging from the energy storage unit 340 to the alternating current power supply.

The AC/DC converter 310 and the first DC/DC converter 320 may be unidirectional AC/DC converters, so as to realize that the charging and discharging device 200 charge or discharge the battery.

The AC/DC converter 310 and the first DC/DC converter 320 may be bidirectional AC/DC converters, so as to realize that the charging and discharging device 200 charge and discharge the battery.

The second DC/DC converter 330 may be a unidirectional AC/DC converter, so that the second DC/DC converter 330 is only used to receive the power released by the battery. The second DC/DC converter 330 may also be a bidirectional AC/DC converter, so that the second DC/DC converter 330 is used to charge the battery and receive the power released by the battery.

At present, most of the batteries in the market are rechargeable storage batteries, and the most common ones are lithium batteries, such as lithium ion batteries or lithium ion polymer batteries. In the charging process, the battery is generally charged through continuous charging, and continuous charging of the battery will cause lithium plating and heating phenomena of the battery, where the lithium plating and heating phenomena will reduce the performance of the battery, greatly shorten the cycle life and limit the fast charging capacity of the battery, and may cause catastrophic consequences such as combustion and explosion, resulting in serious safety problems.

In order to ensure the safety performance of the battery, when the first DC/DC converter and the second DC/DC converter in the charging and discharging device are bidirectional DC/DC converters, in the process of charging the battery, it is realized that the charging and discharging device may charge and discharge the battery based on the charging current and the discharging current which are transmitted by the BMS to prevent continuous charging of the battery, thereby avoiding problems of heating and lithium ion aggregation caused by continuous charging of the battery. Since heating will cause the temperature rise of the battery and crystals generated by lithium ion aggregation may pierce the battery to cause the leakage of electrolyte and shortcircuit of the battery, the temperature rise and shortcircuit of the battery may cause the safety problems of the battery, such as combustion or explosion of the battery. Therefore, through the technical solution of the embodiment of the present application, it is realized that the charging and discharging device charges and discharges the battery based on the charging current and the discharging current which are transmitted by the BMS, which may ensure the safety performance of the battery. In addition, in the continuous charging process, the continuous aggregation of lithium ions will also cause the problem of lithium plating to affect the service life and the charging capability of the battery; therefore, through the technical solution of the embodiment of the present application, the service life and the charging capacity of the battery may be ensured.

Figure 10:
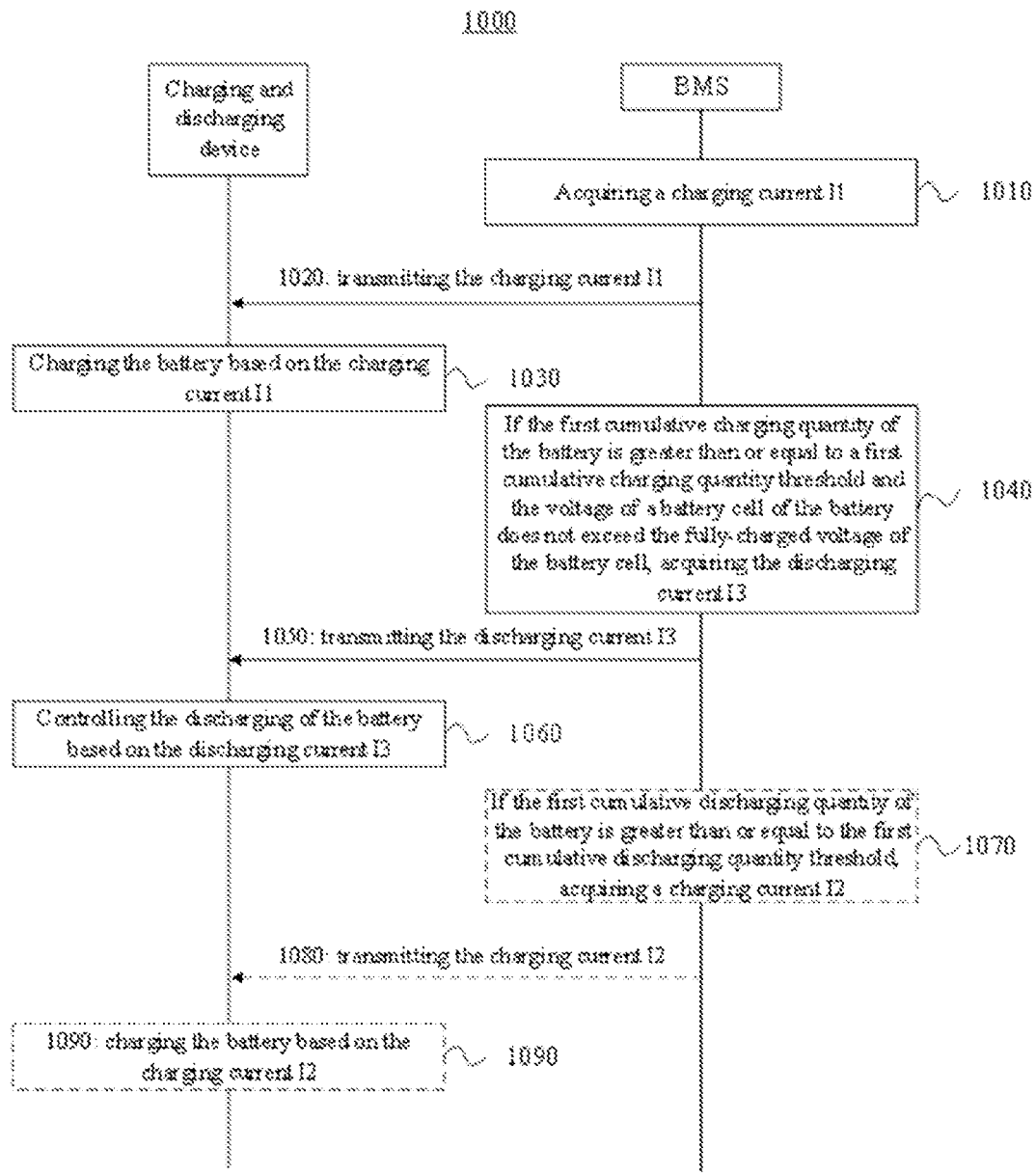
FIG. 10 is a flow interaction diagram of a method of battery charging according to an embodiment of the present application.

FIG. 10 is a schematic flow block diagram of a method 200 of battery charging according to an embodiment of the present application. Optionally, the method 1000 in the embodiment of the present application may be suitable for the charging and discharging device 110 and the battery system 120 shown in FIG. 1.

As shown in FIG. 10, the method of battery charging 1000 may include the following steps.

Step 1010: BMS acquires a charging current I1.

Step 1020: the BMS transmits the charging current I1 to the charging and discharging device.

Step 1030: the charging and discharging device charges the battery based on the charging current I1.

Step 1040: if the first cumulative charging quantity of the battery is greater than or equal to a first cumulative charging quantity threshold and the voltage of a battery cell of the battery does not exceed the fully-charged voltage of the battery cell, the BMS acquires a discharging current I3.

Step 1050: the BMS transmits the discharging current I3 to the charging and discharging device.

Step 1060: the charging and discharging device controls discharging of the battery based on the discharging current I3.

Specifically, in step 210 to step 230, the BMS may enter a charging mode to control the charging and discharging device to charge the battery. Firstly, the BMS acquires a charging current I1; and after the BMS transmits the charging current I1 to the charging and discharging device, the charging and discharging device charges the battery based on the received charging current H.

Optionally, the BMS may acquire the charging current I1 from its own functional unit (for example, a storage unit or a processing unit), or the BMS may also acquire the charging current I1 from other devices. In some implementations, the charging current I1 may be a preset current. The preset current may be a fixed value, or may also change with time according to a preset mode. Or in some other implementations, the charging current I1 may also be a current determined according to state parameters of the battery, and the charging current I1 changes with the change of the state parameters of the battery.

Optionally, when the charging and discharging device charges the battery based on the charging current I1, the BMS may acquire a first cumulative charging quantity of the battery and determine whether the first cumulative charging quantity is greater than or equal to a first cumulative charging quantity threshold. If the first cumulative charging quantity of the battery is greater than or equal to the first cumulative charging quantity threshold and the voltage of the battery cell of the battery does not exceed the fully-charged voltage of the battery cell, the BMS acquires a discharging current I3.

Specifically, as can be seen from the description of the battery in FIG. 1 above, the battery may include one or more battery cells, and the BMS may monitor the voltage of one or more battery cells in the battery so as to monitor whether the battery reaches a fully charged state. Optionally, if the battery includes a plurality of battery cells, the voltages of the plurality of battery cells may be different. In this case, whether the battery reaches the fully-charged state may be determined by determining whether the maximum voltage of the battery cell exceeds the fully-charged voltage of the battery cell. Or in other manners, in addition to the maximum voltage of the battery cell, whether the battery reaches the fully-charged state may be determined by other voltages of the battery cell in the battery.

On the premise that the voltage of the battery cell of the battery does not exceed the fully-charged voltage of the battery cell, that is, the battery does not reach the fully-charged state, if the first cumulative charging quantity of the battery is greater than or equal to the first cumulative charging quantity threshold, the BMS acquires the discharging current I3, that is, for the battery, the charging mode is switched into the discharging mode.

Optionally, the above first cumulative charging quantity may be a first cumulative charging capacity or may also be a first cumulative charging power. Correspondingly, if the first cumulative charging quantity is the first cumulative charging capacity, the first cumulative charging quantity threshold is the first cumulative charging capacity threshold; and if the first cumulative charging quantity is the first cumulative charging power, the first cumulative charging quantity threshold is the first cumulative charging power threshold.

In some implementations, the above first cumulative charging quantity threshold may be a preset threshold. The preset threshold may be a fixed threshold value, or may also change with time according to a preset mode.

In some other implementations, the first cumulative charging quantity threshold may also be determined according to the state parameters of the battery, that is, when the state parameters of the battery change, the first cumulative charging quantity threshold changes. By this implementation, the first cumulative charging quantity threshold may better adapt to the current state parameters of the battery so as to better control the current charging process, thereby improving the charging efficiency of the battery without damage effect on the battery.

Further, in step 240 to step 260, the BMS acquires the discharging current I3 and transmits the discharging current I3 to the charging and discharging device, and the charging and discharging device controls discharging of the battery based on the received discharging current I3.

Optionally, the BMS may acquire the discharging current I3 from its own functional unit such as a storage unit or a processing unit, or the BMS may also acquire the discharging current I3 from other devices. In some implementations, the discharging current I3 may be a preset current. The preset current may be a fixed value, or may also change with time according to a preset mode. Or in some other implementations, the charging current I3 may also be a current determined according to the state parameters of the battery, and the charging current I3 changes with the change of the state parameters of the battery. In some implementations, in the discharging mode or the discharging stage, electricity of the battery may be transmitted to an energy storage device and/or a power grid, which is beneficial to the cyclic utilization of electric energy. The energy storage device may be arranged in the charging and discharging device, and may also be arranged outside the charging and discharging device, so that the energy storage device may receive the discharging current of the battery. The embodiment of the present application does not limit the specific arrangement of the energy storage device. Optionally, in the discharging mode, the power of the battery may be consumed by other ways, and the embodiment of the present application does not limit the specific way of consuming the electric energy.

Further, in the process that the charging and discharging device controls discharging of the battery, the BMS may acquire the first cumulative discharging quantity of the battery in the discharging process and determine whether the first cumulative discharging quantity is greater than or equal to the first cumulative discharging quantity threshold.

Optionally, the above first cumulative discharging quantity may be a first cumulative discharging capacity or may also be a first cumulative discharging power. Correspondingly, if the first cumulative discharging quantity is the first cumulative discharging capacity, the first cumulative discharging quantity threshold is the first cumulative discharging capacity threshold; and if the first cumulative discharging quantity is the first cumulative discharging power, the first cumulative discharging threshold is the first cumulative discharging power threshold.

In some implementations, the above first cumulative discharging quantity threshold may be a preset threshold. The preset threshold may be a fixed threshold value, or may also change with time according to a preset mode.

In some other implementations, the first cumulative discharging quantity threshold may also be determined according to the state parameters of the battery, that is, when the state parameters of the battery change, the first cumulative discharging quantity threshold changes. By this implementation manner, the first cumulative discharging quantity threshold may better adapt to the current state parameters of the battery so as to better control the current discharging process, thereby improving the discharging efficiency of the battery without damage effect on the battery.

When the first cumulative discharging quantity is greater than or equal to the first cumulative discharging quantity threshold, the charging and discharging device controls the battery to stop discharging.

Through the above process, the charging and discharging device charges and discharges the battery based on the charging current I1 and the discharging current I3 which are transmitted by the BMS so as to avoid problems of heating and lithium ion aggregation caused by continuous charging of the battery, thereby avoiding the safety problems of the battery caused by the heating and lithium ion aggregation problems, such as battery consumption or explosion, and ensuring the safety performance of the battery. In addition, after the battery is charged to the first cumulative charging quantity based on the charging current I1 and the power of the battery is released to the first cumulative discharging quantity based on the discharging current I3, lithium ions which are aggregated in the negative electrode of the battery in the charging process may be released so as to avoid the problem of lithium plating during continuous charging, thereby prolonging the service life of the battery and improving the charging capability of the battery.

For battery charging, after one time of charging and one time of discharging, the battery may be continuously charged for the second time, so that the battery can be continuously charged.

Optionally, as shown in FIG. 10, the method of battery charging 1000 in the embodiment of the present application may further include the following steps.

Step 1070: if the first cumulative discharging quantity of the battery is greater than or equal to the first cumulative discharging quantity threshold, the BMS acquires a charging current I2.

Step 1080: the BMS transmits the charging current I2 to the charging and discharging device.

Step 1090: the charging and discharging device charges the battery based on the charging current I2.

Specifically, in the step 1070 to the step 1090, when the BMS determines that the first cumulative discharging quantity of the battery is greater than or equal to the first cumulative discharging quantity threshold, the BMS acquires the charging current I2 and transmits the charging current I2 to the charging and discharging device, and the charging and discharging device continuously charges the battery based on the received charging current I2, that is, for the battery, the discharging mode re-switched to the charging mode. Optionally, other related technical solutions in the step 1070 to the step 1090 may be referenced to the related description of the step 1010 to the step 1030 above, which are not elaborated herein.

It may be understood that in the embodiment of the present application, charging and discharging the battery requires not only the above current information required for charging and discharging, but also voltage information required for charging and discharging. For example, in the step 1010 to the step 230: the BMS acquires the charging current I1 and a charging voltage U1 and transmits the charging current I1 and the charging voltage U1 to the charging and discharging device, where the charging and discharging device is used to charge the battery based on the charging current I1 and the charging voltage U1; and in the step 1040 to the step 260, the BMS acquires the discharging current I3 and a discharging voltage U3 and transmits the discharging current I3 and the discharging voltage U3 to the charging and discharging device, where the charging and discharging device is used to discharge the battery based on the discharging current I3 and the discharging voltage U3. The subsequent charging and discharging process may be similar to the above charging and discharging process, which is not elaborated herein.

Figure 11:
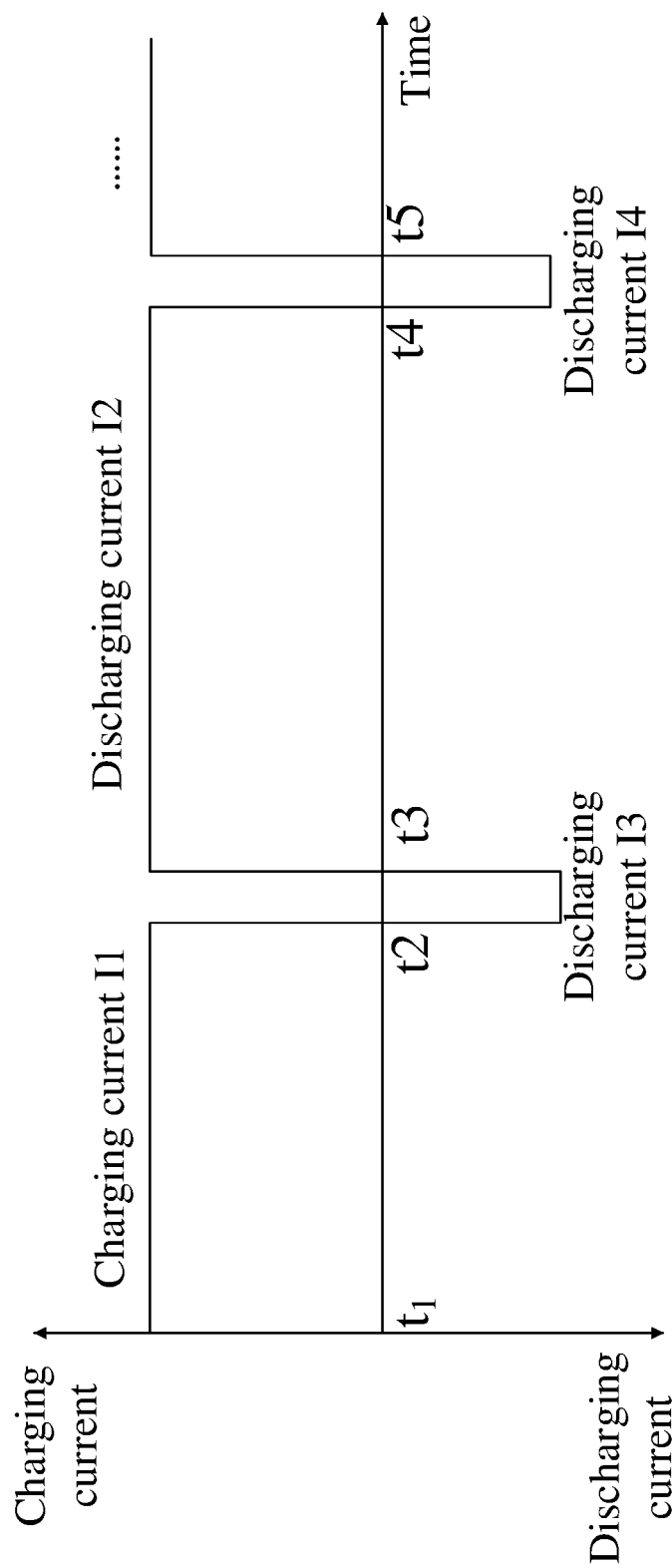
FIG. 11 is a schematic oscillogram of charging current and discharging current of a battery according to an embodiment of the present application.

As an example, FIG. 11 is a schematic oscillogram of charging current and discharging current of a battery according to an embodiment of the present application.

As shown in FIG. 11, from time t1 to t2, the charging and discharging device charges the battery based on the charging current I1 until the first cumulative charging quantity of the battery is greater than or equal to the first cumulative charging quantity threshold and the voltage of the battery cell of the batter does not exceed the fully-charged voltage of the battery cell; and from time t2 to t3, the charging and discharging device controls the battery to discharge based on the discharging current I3 until the first cumulative discharging quantity of the battery is greater than or equal to the first cumulative discharging quantity threshold, optionally, the duration of the discharging current I3 may be less than the duration of the charging current I1. From time t3 to t4, the charging and discharging device continuously charges the battery based on the charging current I2 until a second cumulative charging quantity of the battery is greater than or equal to a second cumulative charging quantity threshold and the voltage of the battery cell of the batter does not exceed the fully-charged voltage of the battery cell; and from time t4 to t5, the charging and discharging device controls the battery to discharge based on a discharging current I4 until a second cumulative discharging quantity of the battery is greater than or equal to a second cumulative discharging quantity threshold, optionally, the duration of the charging current I2 may be less than the duration of the charging current I1. It may be understood that the above charging and discharging process is continuously performed until the battery is fully-charged.

It should be noted that FIG. 11 only schematically shows an oscillogram of the charging current I1, the charging current I2, the discharging current I3 and the discharging current I4. The charging current I1 may be a constant current shown in FIG. 11 from t1 to t2, or may be a changing current that changes with time. Similarly, the charging current I2, the discharging current I3 and the discharging current I4 may be constant currents shown in FIG. 11, or may be currents that change with time. In addition, as schematically shown in FIG. 11, the charging current I1 and the charging current I2 have the same magnitude, and the discharging current I3 and the discharging current I4 have the same magnitude; in addition, the charging current I1 and the charging current I2 may have different magnitudes, and the discharging current I3 and the discharging current I4 may have different magnitudes, which is not specifically limited in the embodiment of the present application.

Optionally, if the voltage of the battery cell of the battery exceeds the fully-charged voltage of the battery cell, the BMS transmits a charging stop command to the charging and discharging device, so that the charging and discharging device stops charging the battery.

Optionally, in order to achieve fast charging with high-current, the range of the charging rate of the charging current I1 and/or the charging current I2 is from 2C to 10C.

Further, the discharging current in the embodiment of the present application is a low current, which is intended to release lithium ions aggregated in the negative electrode of the battery through the discharging of the low current of the battery, thereby avoiding excessive loss of the power charged into the battery.

Specifically, the discharging current I3 and/or the discharging current I4 in the above method may be low current. In addition, after the charging and discharging device controls the battery to discharge based on the discharging current I4, the discharging current of the subsequent discharging process may also be low current.

Optionally, in order to achieve discharging with low-current, the range of the charging rate of the discharging current I3 and/or the discharging current I4 is from 0.1C to 1C.

Optionally, in the above method, in order to better control the charging quantity of the battery in the charging process and the discharging quantity of the battery in the discharging process, a ratio of a cumulative discharging quantity threshold in the discharging process to a cumulative charging quantity threshold in the charging process may be set, so that the discharging quantity is smaller, thereby avoiding excessive loss of the power charged into the battery.

As an example, in the above method, the ratio of the first cumulative discharging quantity threshold to the first cumulative charging quantity threshold is less than or equal to 10%, and/or the ratio of a second cumulative discharging quantity threshold to a second cumulative charging quantity threshold is less than or equal to 10%.

In addition, after the charging and discharging device charges the battery and controls the battery to discharge based on the charging current I2 and a second discharging current, the ratio of the cumulative discharging quantity threshold to the cumulative charging quantity threshold in the subsequent charging and discharging process may also be less than or equal to 10%.

It should be noted that the above ratio 10% may also be adjusted with the change of the application scenario and the application requirement, and the embodiment of the present application does not limit the specific value of the ratio.

Optionally, in the above method embodiment, the charging current I1 and the charging current I2 which are acquired by the BMS may be the same or different. The charging current I1 and/or the charging current I2 may be a preset current, or the charging current I1 and/or the charging current I2 may also be a current determined according to the state parameters of the battery. When the state parameters of the battery change, the charging current I1 and/or the charging current I2 may be different currents corresponding to different state parameters. The state parameters of the battery include at least one parameter of the followings: a battery temperature, a battery voltage, a battery current, a state of charge (SOC) of the battery, and a state of health (SOH) of the battery.

Similarly, the discharging current I3 and the discharging current I4 which are acquired by the BMS may be the same or different. The discharging current I3 and/or the discharging current I4 may be a preset current, or the discharging current I3 and/or the discharging current I4 may be a current determined according to the state parameters of the battery.

If at least one of the charging current I1, the charging current I2, the discharging current I3 and the discharging current I4 is the current determined according to the state parameters of the battery, the current may better adapt to the current state parameters of the battery, so that the charging efficiency and/or the discharging efficiency of the battery are improved without damage effect on the battery.

In addition, after the charging and discharging device charges the battery and controls the battery to discharge based on the charging current I2 and the second discharging current, the charging current and/or the discharging current in the subsequent charging and discharging process may also be a preset current, or may also be a current determined according to the state parameters of the battery.

Optionally, there may be many ways to determine the charging current and the discharging current according to the state parameters of the battery. As an example, a mapping relationship between the state parameters, and the charging current and the discharging current may be acquired. According to the mapping relationship, the specific charging current and discharging current are determined through the state parameters of the battery. The mapping relationship may be a mapping relationship obtained by fitting a large amount of experimental data, and has high credibility and accuracy. The mapping relationship specifically may be a mapping table, a mapping picture or a mapping formula. In addition, in other examples, a dedicated neural network mode may be trained according to a large amount of experimental data. The neural network model may output the charging current and the discharging current according to the input state parameter of the battery.

In the embodiment of the present application, the BMS may acquire the charging current I1, the discharging current I3 and the charging current I2 regularly. Correspondingly, the BMS may transmit the charging current I1, the discharging current I3 and the charging current I2 to the charging and discharging device regularly.

It may be understood that in the above embodiment, charging and discharging the battery requires not only the above current information required for charging and discharging, but also voltage information required for charging and discharging. The way of acquiring the voltage required for charging and discharging does not impose any limitation to the embodiment of the present application.

Optionally, in the above method embodiment, communication between the BMS and the charging and discharging device is compatible with an existing communication protocol between a charger and the BMS; therefore, it is convenient that communication between the BMS and the charging and discharging device is realized, and a good application prospect is achieved.

Specifically, on the basis of the above method embodiment, the BMS may also acquire at least one of a charging voltage U1, a charging voltage U2, a discharging voltage U3 and a discharging voltage U4, and transmit at least one of the charging voltage U1, the charging voltage U2, the discharging voltage U3 and the discharging voltage U4 to the charging and discharging device, where the charging current I1 and the charging voltage U1 are carried in a first battery charging demand message (BCL message), and/or the discharging current I3 and the discharging voltage U3 are carried in a second BCL message, and/or the charging current I2 and the charging voltage U2 are carried in a third BCL message, and/or the discharging current I4 and the discharging voltage U4 are carried in a fourth BCL message.

In addition, after the charging and discharging device charges the battery and controls the battery to discharge based on the charging current I2 and the second discharging current, the charging current, the charging voltage, the discharging current and the discharging voltage in the subsequent charging and discharging process may also be carried in the BCL message, and are transmitted to the charging and discharging device through the BMS.

Optionally, the above alternating current power supply includes, but is not limited to a power grid, which may be used to provide three-phase alternating current. The power grid can provide sufficient power to charge the battery, and also can receive more power released by the battery.

Or in other implementation, the above alternating current power supply may also be a single-phase alternating current power supply. The embodiment of the present application does not limit the specific type of the alternating current power supply.

It should be noted that in the embodiment of the present application, the power conversion unit 220 may be connected to the AC power supply as shown in FIG. 3 and may also be connected to a DC power supply. At this time, the power conversion unit 220 may only include a DC/DC converter so as to transmit current between the battery and the DC power supply.

FIG. 12 shows a method 1200 of battery charging according to the embodiment of the present application. The method 1200 may be applied to the charging and discharging device with the power conversion unit 1120 shown in FIG. 3. The charging and discharging device includes an alternating current/direct current (AC/DC) converter, a first direct current/direct current (DC/DC) converter, a second DC/DC converter and a control unit, where one end of the second DC/DC converter is connected between the first DC/DC converter and the AC/DC converter and the other end is connected to an energy storage unit. As shown in FIG. 12, the method includes:

Step 1210: a first charging request transmitted by a BMS of the battery is received, where the first charging request includes a first charging voltage and a first charging current.

Step 1220: output power of the first DC/DC converter is set as first output power of the first DC/DC converter based on the first charging voltage and the first charging current.

Step 1230: the SOC of the energy storage unit is acquired.

Step 1240: the second DC/DC converter is turned on if the SOC of the energy storage unit is greater than a first threshold, so that the battery is charged by the energy storage unit through the first DC/DC converter and the second DC/DC converter.

Step 1250: a bus voltage of the charging and discharging device is acquired in real time.

Step 1260: in the process of charging the battery by the energy storage unit, if the bus voltage is less than the bus balance voltage and the difference between the bus voltage and the bus balance voltage exceeds a preset value, the output power of the second DC/DC converter is adjusted to the first output power of the second DC/DC converter, where the first output power of the second DC/DC converter is less than or equal to the maximum output power of the second DC/DC converter.

Where the difference between the bus voltage and the bus balance voltage is less than or equal to the preset value when the second DC/DC converter works on the basis of the first output power of the second DC/DC converter.

It should be understood that the specific details of the method shown in FIG. 12 may be referenced to the foregoing description of FIG. 4 to FIG. 6, and for brevity, the details are not elaborated herein.

FIG. 13 shows a method 1300 of battery discharging according to the embodiment of the present application. The method 1300 may be applied to the charging and discharging device with the power conversion unit 1130 shown in FIG. 3. The charging and discharging device includes an alternating current/direct current (AC/DC) converter, a first direct current/direct current (DC/DC) converter, a second DC/DC converter and a control unit, where one end of the second DC/DC converter is connected between the first DC/DC converter and the AC/DC converter and the other end is connected to an energy storage unit. As shown in FIG. 13, the method includes:

Step 1310: a first discharging request transmitted by a BMS of the battery is received, where the first the discharging request includes a first discharging voltage and a first discharging current.

Step 1320: input power of the first DC/DC converter is set as first input power of the first DC/DC converter based on the first discharging voltage and the first discharging current.

Step 1330: the SOC of the energy storage unit is acquired.

Step 1340: the second DC/DC converter is turned on if the SOC of the energy storage unit is less than a third threshold, so that the power of the battery is released to the energy storage unit through the first DC/DC converter and the second DC/DC converter.

Step 1350: a bus voltage of the charging and discharging device is acquired in real time.

Step 1360: in the process of releasing the power of the battery to the energy storage unit, if the bus voltage is greater than the bus balance voltage and the difference between the bus voltage and the bus balance voltage exceeds a preset value, the input power of the second DC/DC converter is adjusted to the first input power of the second DC/DC converter, where the first input power of the second DC/DC converter is less than or equal to the maximum input power of the second DC/DC converter.

Where the difference between the bus voltage and the bus balance voltage is less than or equal to the preset value when the second DC/DC converter works on the basis of the first input power of the second DC/DC converter.

It should be understood that the specific details of the method shown in FIG. 13 may be referenced to the foregoing description of FIG. 7 to FIG. 9, and for brevity, the details are not elaborated herein.

Figure 14:
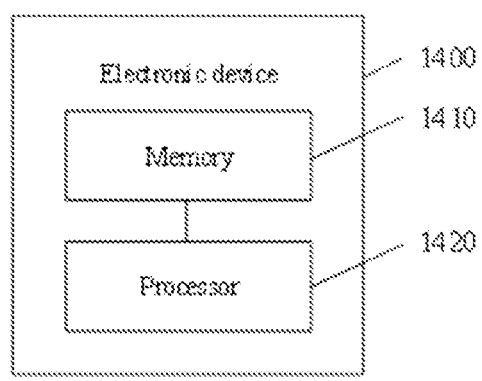
FIG. 14 is a schematic structural block diagram of an electronic device according to an embodiment of the present application.

FIG. 14 is a schematic structural block diagram of an electronic device 1400 according to an embodiment of the present application. As shown in FIG. 14, the electronic device 1400 includes a memory 1410 and a processor 1414, where the memory 1410 is used to store a computer program; and the processor 1414 is used to read the computer program and perform the foregoing methods according to various embodiments of the present application.

Optionally, the electronic device 1400 may be applied to any one or more of the BMS and the charging and discharging device. In the embodiment of the present application, the processor in the charging and discharging device reads the corresponding computer program and performs the charging method corresponding to the charging and discharging device in the above various embodiments based on the computer program, and the processor in the BMS may also read the corresponding computer program and perform the charging method corresponding to the BMS in the above various embodiments based on the computer program.

In addition, the embodiment of the present application further provides a readable storage medium which is used to store a computer program, where the computer program is used to perform the above methods in the various embodiments of the present application. Optionally, the computer program may be a computer program in the above charging and discharging device and/or BMS.

It should be understood that the specific examples in the specification are only intended to help those skilled in the art to better understand the embodiments of the present application and do not limit the scope of the embodiments of the present application.

It should be understood that, the serial number of each process of various embodiments does not indicate the order of performing the process. The order of performing each process should be determined by its function and internal logic, and shall not limit the implementation of the embodiments of the present application.

It should also be understood that various implementation manners described in this specification may be implemented alone or in combination, which is not limited by the embodiments of the present application.

Although the present application has been described with reference to the preferred embodiments, various improvements may be made and components therein may be replaced with equivalents without departing from the scope of the present application. In particular, as long as there is no structural conflict, the technical features in the embodiments can be combined in any way. The present application is not limited to the specific embodiments disclosed herein, but shall include all technical solutions falling within the scope of the claims.

What is claimed is:

1. A charging and discharging device, comprising an alternating current/direct current (AC/DC) converter, a first direct current/direct current (DC/DC) converter, a second DC/DC converter and a control unit, wherein one end of the second DC/DC converter is connected between the first DC/DC converter and the AC/DC converter and the other end of the second DC/DC converter is connected to an energy storage unit; and the control unit is configured to:
receive a first charging request transmitted by a battery management system (BMS) of a battery, the first charging request comprising a first charging voltage and a first charging current,
set output power of the first DC/DC converter as first output power of the first DC/DC converter based on the first charging voltage and the first charging current,
acquire a state of charge (SOC) of the energy storage unit,
turn on the second DC/DC converter under the condition that the SOC of the energy storage unit is greater than a first threshold, to charge the battery by the energy storage unit through the first DC/DC converter and the second DC/DC converter,
acquire a bus voltage of the charging and discharging device in real time, and
adjust output power of the second DC/DC converter to the first output power of the second DC/DC converter under the condition that the battery is charged by the energy storage unit, the bus voltage is less than a bus balance voltage and a difference between the bus voltage and the bus balance voltage exceeds a preset value, the first output power of the second DC/DC converter being less than or equal to a maximum output power of the second DC/DC converter,
wherein the difference between the bus voltage and the bus balance voltage is less than or equal to the preset value after the output power of the second DC/DC converter is adjusted to the first output power of the second DC/DC converter.

2. The charging and discharging device according to claim 1, wherein the control unit is further configured to:
adjust the output power of the second DC/DC converter to the maximum output power of the second DC/DC converter under the condition that the battery is charged by the energy storage unit, the bus voltage is less than the bus balance voltage and the difference between the bus voltage and the bus balance voltage exceeds the preset value turn on the AC/DC converter, and adjust the output power of the AC/DC converter to the first output power of the AC/DC converter, to charge the battery by an alternating current power supply through the AC/DC converter and the first DC/DC converter simultaneously,
wherein the difference between the bus voltage and the bus balance voltage is less than or equal to the preset value after the output power of the second DC/DC converter is adjusted to the maximum output power of the second DC/DC converter and the output power of the AC/DC converter is adjusted to the first output power of the AC/DC converter.

3. The charging and discharging device according to claim 2, wherein the control unit is further configured to:
receive a second charging request transmitted by the BMS, the second charging request comprising a second charging voltage and a second charging current;
set the output power of the first DC/DC converter as second output power of the first DC/DC converter based on the second charging voltage and the second charging current, the second output power of the first DC/DC converter being less than the first output power of the first DC/DC converter; and maintain the output power of the second DC/DC converter as the maximum output power of the second DC/DC converter and adjust the first output power of the AC/DC converter to be reduced to the second output power of the AC/DC converter under the condition that the battery is charged by the energy storage unit, the bus voltage is greater than the bus balance voltage and the difference between the bus voltage and the bus balance voltage exceeds the preset value and the alternating current power supply, wherein the difference between the bus voltage and the bus balance voltage is less than or equal to the preset value after the output power of the second DC/DC converter is adjusted to the maximum output power of the second DC/DC converter and the output power of the AC/DC converter is adjusted to the second output power of the AC/DC converter.

4. The charging and discharging device according to claim 3, wherein the control unit is further configured to:

adjust the first output power of the AC/DC converter to zero and adjust the output power of the second DC/DC converter from the maximum output power of the second DC/DC converter to the second output power of the second DC/DC converter under the condition that the bus voltage is greater than the bus balance voltage and the difference between the bus voltage and the bus balance voltage exceeds the preset value, wherein the difference between the bus voltage and the bus balance voltage is less than or equal to the preset value after the output power of the second DC/DC converter is adjusted to the second output power of the second DC/DC converter.

5. The charging and discharging device according to claim 1, wherein the control unit is further configured to:

turn on the AC/DC converter under the condition that the SOC of the energy storage unit is greater than a second threshold and less than the first threshold, so as to charge the battery by the alternating current power supply through the first DC/DC converter and the AC/DC converter; and adjust the output power of the AC/DC converter to third output power of the AC/DC converter under the condition that the bus voltage is less than the bus balance voltage and the difference between the bus voltage and the bus balance voltage exceeds the preset value in the process of charging the battery by the alternating current power supply, the third output power of the AC/DC converter being less than or equal to the maximum output power of the AC/DC converter, and wherein the difference between the bus voltage and the bus balance voltage is less than or equal to the preset value after the output power of the AC/DC converter is adjusted to the third output power of the AC/DC converter.

6. The charging and discharging device according to claim 5, wherein the control unit is further configured to:

adjust the output power of the AC/DC converter to the maximum output power of the second DC/DC converter, turn on the second DC/DC converter, and adjust the output power of the second DC/DC converter to the third output power of the second DC/DC converter under the condition that the bus voltage is less than the bus balance voltage and the difference between the bus voltage and the bus balance voltage exceeds the preset value in the process of charging the battery by the alternating current power supply, so as to charge the battery by the energy storage unit through the first DC/DC converter and the second DC/DC converter, wherein the difference between the bus voltage and the bus balance voltage is less than the preset value after the output power of the AC/DC converter is adjusted to the maximum output power of the AC/DC converter and the second DC/DC converter is adjusted to the third output power of the second DC/DC converter.

7. The charging and discharging device according to claim 6, wherein the control unit is further configured to:

receive a third charging request transmitted by the BMS, the third charging request comprising s a third charging voltage and a third charging current;

set the output power of the first DC/DC converter as the third output power of the first DC/DC converter based on the third charging voltage and the third charging current, the third output power of the first DC/DC converter being less than the first output power of the first DC/DC converter;

maintain the output power of the AC/DC converter as the maximum output power of the AC/DC converter and adjust the third output power of the second DC/DC converter to be reduced to fourth output power of the second DC/DC converter under the condition that the bus voltage is greater than the bus balance voltage and the difference between the bus voltage and the bus balance voltage exceeds the preset value in the process of charging the battery by the energy storage unit and the alternating current power supply, wherein the difference between the bus voltage and the bus balance voltage is less than or equal to the preset value after the output power of the second DC/DC converter is adjusted to the fourth output power of the second DC/DC converter and the AC/DC converter works on the basis of the maximum output power of the AC/DC converter.

8. The charging and discharging device according to claim 7, wherein the control unit is further configured to:

adjust the fourth output power of the second DC/DC converter to zero and adjust the output power of the AC/DC converter from the maximum output power of the AC/DC converter to the fourth output power of the AC/DC converter under the condition that the bus voltage is greater than the bus balance voltage and the difference between the bus voltage and the bus balance voltage exceeds the preset value, wherein the difference between the bus voltage and the bus balance voltage is less than or equal to the preset value after the output power of the AC/DC converter is adjusted to the fourth output power of the AC/DC converter and the output power of the second DC/DC converter is adjusted to zero.

9. The charging and discharging device according to claim 1, wherein the control unit is further configured to:

turn on the AC/DC converter under the condition that the SOC of the energy storage unit is less than a second threshold, so as to charge the battery by the alternating current power supply through the first DC/DC converter and the AC/DC converter; and adjust input power of the AC/DC converter to fifth output power of the AC/DC converter under the condition that the bus voltage is less than the bus balance voltage and the difference between the bus voltage and the bus balance voltage exceeds the preset value in the process of charging the battery by the alternating current power supply, the fifth output power of the AC/DC converter being less than the maximum output power of the AC/DC converter, wherein the difference between the bus voltage and the bus balance voltage is less than or equal to the preset value after the output power of the AC/DC converter is adjusted to the fifth output power of the AC/DC converter.

10. The charging and discharging device according to claim 9, wherein the control unit is further configured to:

adjust the input power of the AC/DC converter to the maximum input power of the AC/DC converter and set the output power of the first DC/DC converter as the maximum input power of the AC/DC converter under the condition that the battery is charged by the alternating current power supply, the bus voltage is less than the bus balance voltage and the difference between the bus voltage and the bus balance voltage is greater than the preset value.

11. The charging and discharging device according to claim 9, wherein the control unit is further configured to:

receive a fourth charging request transmitted by the BMS, the fourth charging request comprising a fourth charging voltage and a fourth charging current;

set the output power of the first DC/DC converter as fourth output power of the first DC/DC converter based on the fourth charging voltage and the fourth charging current, the fourth output power of the first DC/DC converter being less than the first output power of the first DC/DC converter; and turn on the second DC/DC converter under the condition that the battery is charged by the alternating current power supply, the bus voltage is greater than the bus balance voltage and the difference between the bus voltage and the bus balance voltage is greater than the preset value, so as to charge the energy storage unit through the alternating current power supply.

12. The charging and discharging device according to claim 1, wherein the first DC/DC converter is a unidirectional DC/DC converter or a bidirectional DC/DC converter, and the second DC/DC converter is a unidirectional DC/DC converter or a bidirectional DC/DC converter.

13. A method of battery charging, applied to a charging and discharging device, wherein the charging and discharging device comprises an alternating current/direct current (AC/DC) converter, a first direct current/direct current (DC/DC) converter, a second DC/DC converter and a control unit, wherein one end of the second DC/DC converter is connected between the first DC/DC converter and the AC/DC converter and the other end of the second DC/DC converter is connected to an energy storage unit; and the method comprises:

receiving a first charging request transmitted by a battery management system (BMS) of a battery, the first charging request comprising a first charging voltage and a first charging current, setting output power of the first DC/DC converter as first output power of the first DC/DC converter based on the first charging voltage and the first charging current, acquiring a state of charge (SOC) of the battery of the energy storage unit, turning on the second DC/DC converter under the condition that the SOC of the energy storage unit is greater than a first threshold, to charge the battery by the energy storage unit through the first DC/DC converter and the second DC/DC converter, acquiring a bus voltage of the charging and discharging device in real time, and adjust the output power of the second DC/DC converter to first output power of the second DC/DC converter under the condition that the battery is charged by the energy storage unit, the bus voltage is less than a bus balance voltage and a difference between the bus voltage and the bus balance voltage exceeds a preset value, the first output power of the second DC/DC converter being less than or equal to the maximum output power of the second DC/DC converter, wherein the difference between the bus voltage and the bus balance voltage is less than or equal to the preset value after the output power of the second DC/DC converter is adjusted to the first output power of the second DC/DC converter.

14. The method according to claim 13, wherein the method further comprises:

adjusting the output power of the second DC/DC converter to the maximum output power of the second DC/DC converter under the condition that the battery is charged by the energy storage unit, the bus voltage is less than the bus balance voltage and the difference between the bus voltage and the bus balance voltage exceeds the preset value, turning on the AC/DC converter, and adjusting the output power of the AC/DC converter to the first output power of the AC/DC converter, to charge the battery by an alternating current power supply through the AC/DC converter and the first DC/DC converter simultaneously, wherein the difference between the bus voltage and the bus balance voltage is less than or equal to the preset value after the output power of the second DC/DC converter is adjusted to the maximum output power of the second DC/DC converter and the AC/DC converter is adjusted to the first output power of the AC/DC converter.

15. The method according to claim 14, wherein the method further comprises:

receiving a second charging request transmitted by the BMS, the second charging request comprising a second charging voltage and a second charging current;

setting the output power of the first DC/DC converter as second output power of the first DC/DC converter based on the second charging voltage and the second charging current, the second output power of the first DC/DC converter being less than the first output power of the first DC/DC converter; and maintaining the output power of the second DC/DC converter as the maximum output power of the second DC/DC converter and adjust the first output power of the AC/DC converter to be reduced to the second output power of the AC/DC converter under the condition that the battery is charged by the energy storage unit and the alternating current power supply, the bus voltage is greater than the bus balance voltage and the difference between the bus voltage and the bus balance voltage exceeds the preset value, wherein the difference between the bus voltage and the bus balance voltage is less than or equal to the preset value after the output power of the second DC/DC converter is adjusted to the maximum output power of the second DC/DC converter and the AC/DC converter is adjusted to the second output power of the AC/DC converter.

16. The method according to claim 15, wherein the method further comprises:

adjusting the first output power of the AC/DC converter to zero and adjust the output power of the second DC/DC converter from the maximum output power of the second DC/DC converter to the second output power of the second DC/DC converter under the condition that the bus voltage is greater than the bus balance voltage and the difference between the bus voltage and the bus balance voltage exceeds the preset value, wherein the difference between the bus voltage and the bus balance voltage is less than or equal to the preset value after the output power of the second DC/DC converter is adjusted to the second output power of the second DC/DC converter.

17. The method according to claim 13, wherein the method further comprises:

turning on the AC/DC converter under the condition that the SOC of the energy storage unit is greater than a second threshold and less than the first threshold, so as to charge the battery by the alternating current power supply through the first DC/DC converter and the AC/DC converter; and adjusting the output power of the AC/DC converter to third output power of the AC/DC converter under the condition that the battery is charged by the alternating current power supply, the bus voltage is less than the bus balance voltage and the difference between the bus voltage and the bus balance voltage exceeds the preset value, the third output power of the AC/DC converter being less than or equal to the maximum output power of the AC/DC converter, and wherein the difference between the bus voltage and the bus balance voltage is less than or equal to the preset value after the output power of the AC/DC converter is adjusted to the third output power of the AC/DC converter.

18. The method according to claim 17, wherein the method further comprises:

adjusting the output power of the AC/DC converter to the maximum output power of the second DC/DC converter, turn on the second DC/DC converter, and adjusting the output power of the second DC/DC converter to the third output power of the second DC/DC converter under the condition that the battery is charged by the alternating current power supply, the bus voltage is less than the bus balance voltage and the difference between the bus voltage and the bus balance voltage exceeds the preset value, so as to charge the battery by the energy storage unit through the first DC/DC converter and the second DC/DC converter, wherein the difference between the bus voltage and the bus balance voltage is less than the preset value after the output power of the AC/DC converter is adjusted to the maximum output power of the AC/DC converter and the second DC/DC converter is adjusted to the third output power of the second DC/DC converter.

19. The method according to claim 18, wherein the method further comprises:

receiving a third charging request transmitted by the BMS, the third charging request comprising s a third charging voltage and a third charging current;

setting the output power of the first DC/DC converter as the third output power of the first DC/DC converter based on the third charging voltage and the third charging current, the third output power of the first DC/DC converter being less than the first output power of the first DC/DC converter;

maintaining the output power of the AC/DC converter as the maximum output power of the AC/DC converter and adjust the third output power of the second DC/DC converter to be reduced to fourth output power of the second DC/DC converter under the condition that the battery is charged by the energy storage unit, the bus voltage is greater than the bus balance voltage and the difference between the bus voltage and the bus balance voltage exceeds the preset value and the alternating current power supply, wherein the difference between the bus voltage and the bus balance voltage is less than or equal to the preset value after the output power of the second DC/DC converter is adjusted to the fourth output power of the second DC/DC converter and the AC/DC converter is adjusted to the maximum output power of the AC/DC converter.

20. A charging and discharging device, comprising: a processor and a memory, wherein the memory is configured to store a computer program; and the processor is configured to execute the computer program to implement the method of battery charging according to claim 13.

* * * * *